US009859777B2

(12) United States Patent
Sarlioglu et al.

(10) Patent No.: US 9,859,777 B2
(45) Date of Patent: Jan. 2, 2018

(54) AXIAL FLUX SWITCHING PERMANENT MAGNET MACHINE

(71) Applicant: Wisconsin Alumni Research Foundation, Madison, WI (US)

(72) Inventors: Bulent Sarlioglu, Madison, WI (US); Ju Hyung Kim, Madison, WI (US); Yingjie Li, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 409 days.

(21) Appl. No.: 14/714,431

(22) Filed: May 18, 2015

(65) Prior Publication Data

US 2016/0344272 A1 Nov. 24, 2016

(51) Int. Cl.
*H02K 1/14* (2006.01)
*H02K 21/44* (2006.01)
*H02K 16/02* (2006.01)
*H02K 16/04* (2006.01)
*H02K 1/17* (2006.01)
*H02K 3/28* (2006.01)

(52) U.S. Cl.
CPC ............. *H02K 21/44* (2013.01); *H02K 1/146* (2013.01); *H02K 1/17* (2013.01); *H02K 3/28* (2013.01)

(58) Field of Classification Search
CPC .......... H02K 1/146; H02K 1/17; H02K 1/182; H02K 1/223; H02K 3/28; H02K 19/06; H02K 21/04; H02K 21/44; H02K 16/00; H02K 16/02; H02K 16/025; H02K 16/04
USPC ............. 310/46, 181, 112, 154.02, 266, 268, 310/216.008, 216.009
See application file for complete search history.

(56) References Cited

U.S. PATENT DOCUMENTS

| 5,925,965 | A   | * | 7/1999 | Li ......................... H02K 16/04 310/112 |
| 7,034,422 | B2  |   | 4/2006 | Ramu |
| 2007/0018520 | A1 | * | 1/2007 | Kaneko .................. H02K 21/24 310/268 |
| 2007/0046124 | A1 | * | 3/2007 | Aydin .................. H02K 1/2793 310/268 |

(Continued)

OTHER PUBLICATIONS

Wang et al., Preliminary study on a 3D field permanent magnet flux switching machine—from tubular to rotary configurations, Journal of International Conference on Electrical Machines and Systems, vol. 1, No. 4, Dec. 2012, pp. 505-508.

(Continued)

*Primary Examiner* — Michael Andrews
(74) *Attorney, Agent, or Firm* — Bell & Manning, LLC

(57) ABSTRACT

An electric machine includes a rotor, a first and second stator, a first and second plurality of permanent magnets, a first and second winding, a third and fourth winding. The first stator and the second stator are mounted axially relative to the rotor. A first permanent magnet and a second permanent magnet of the first plurality of permanent magnets have opposite polarities. A first permanent magnet and a second permanent magnet of the second plurality of permanent magnets have opposite polarities. The first winding, the second winding, the third winding, and the fourth winding are connected in series. An absolute value of an angle offset between the first winding and the third winding and between closest poles of the first plurality of poles and the second plurality of poles is 180 electrical degrees.

20 Claims, 15 Drawing Sheets

(56) References Cited

U.S. PATENT DOCUMENTS

| | | | |
|---|---|---|---|
| 2009/0091198 A1* | 4/2009 | Husband | H02K 21/44 310/46 |
| 2009/0243422 A1* | 10/2009 | Atarashi | H02K 1/165 310/216.074 |
| 2010/0231079 A1* | 9/2010 | Abe | H02K 1/2793 310/156.35 |
| 2010/0295389 A1 | 11/2010 | Tessier et al. | |
| 2013/0113318 A1* | 5/2013 | Nishiyama | H02K 21/44 310/114 |
| 2013/0249324 A1 | 9/2013 | Gandhi et al. | |
| 2014/0049124 A1 | 2/2014 | Gandhi et al. | |
| 2014/0062267 A1 | 3/2014 | Pollock et al. | |

OTHER PUBLICATIONS

Z.Q. Zhu, Novel Switched Flux Permanent Magnet Machine Topologies, Transactions of China Electrotechnical Society, vol. 27, No. 7, Jul. 2012, pp. 1-16.

Zhang et al., Analysis of a novel hybrid-excitation flux-switching brushless machine, Downloaded from http://intermag2014.ifw-dresden.de/index.php?id=32&no_cache=1&pd=960 on Jul. 17, 2014, pp. 1-2.

Somesan et al., Design of a Permanent Magnet Flux-Switching Machine, IEEE, May 21, 2012, pp. 256-259.

\* cited by examiner

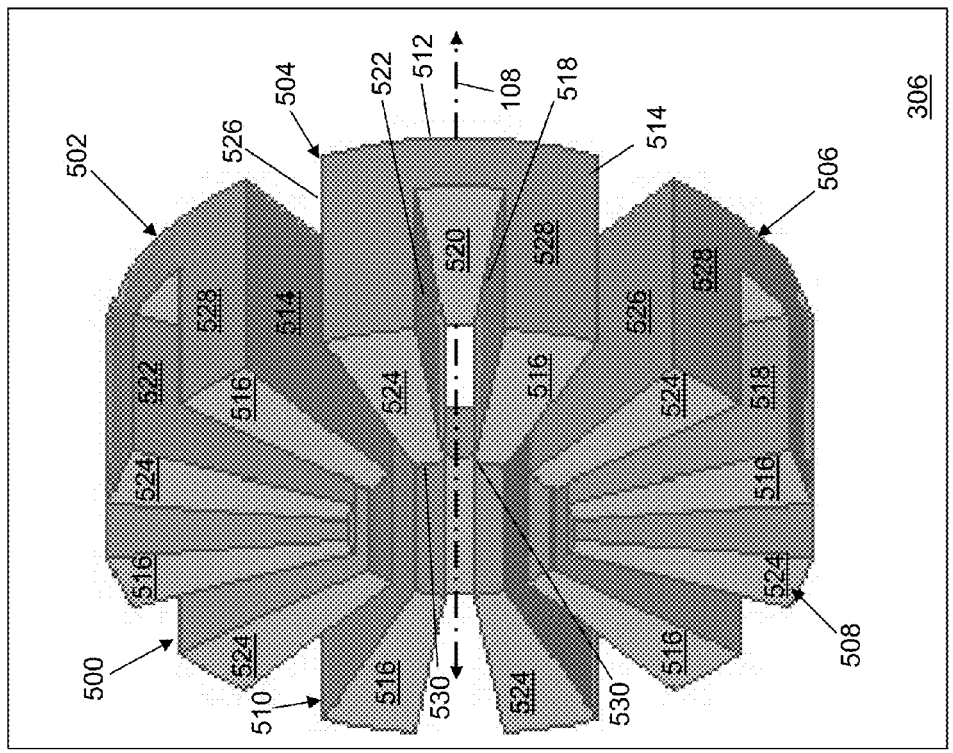
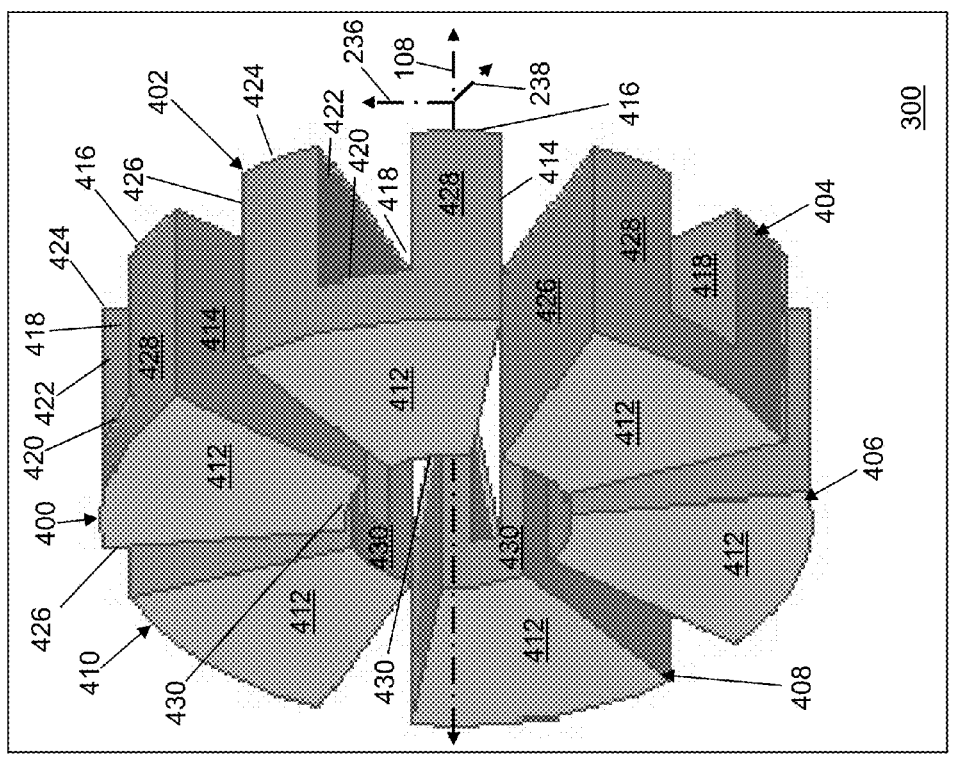
Fig. 5
Fig. 4

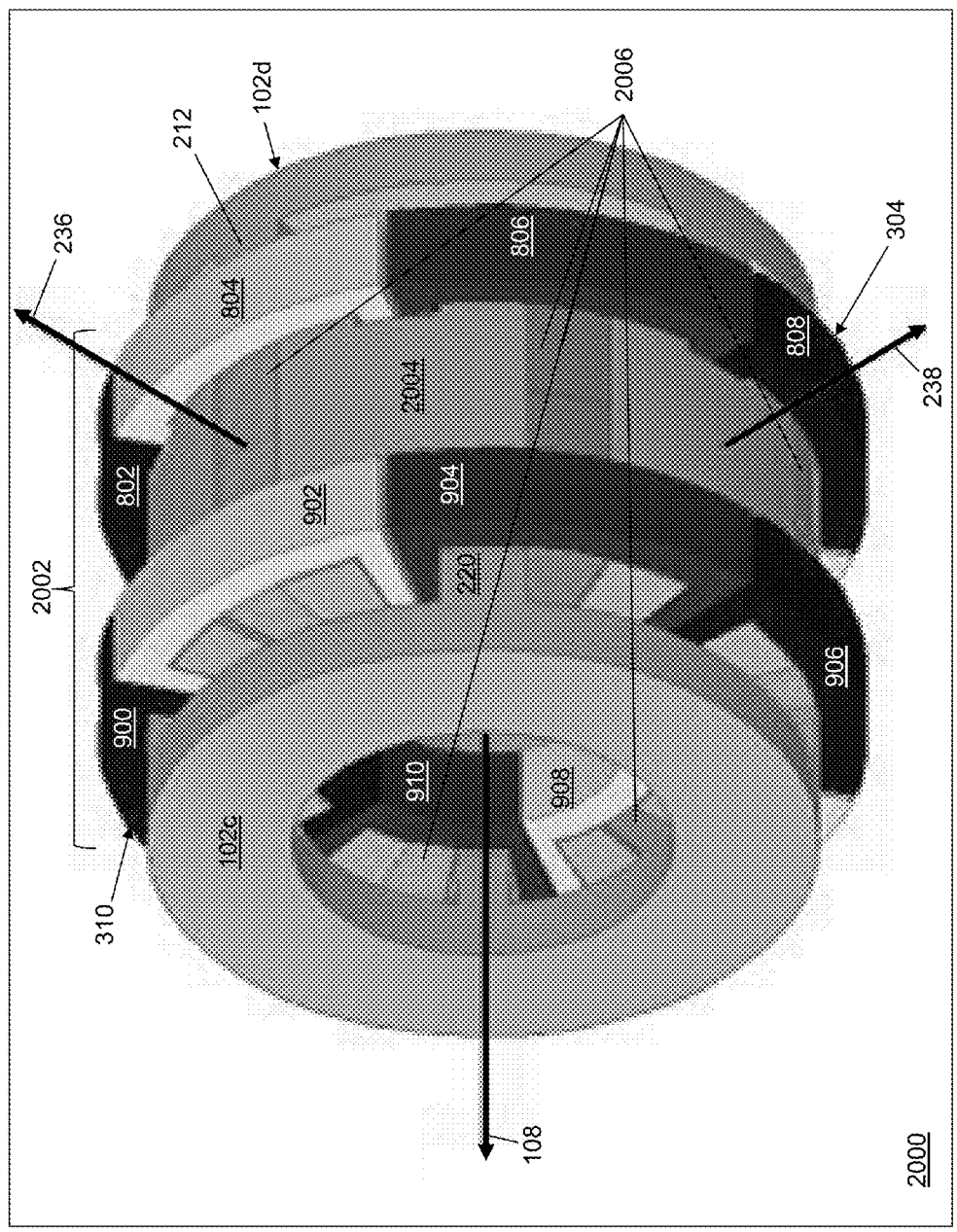

AXIAL FLUX SWITCHING PERMANENT MAGNET MACHINE

BACKGROUND

The excitation frequency, $f_e$, of a flux switching permanent magnet (FSPM) machine is proportional to the number of rotor poles ($p_r$), $f_e = np_r/60$, and not pole pairs, where n is the rotational speed in revolutions per minute (rpm). A typical FSPM machine has 12 stator slots and 10 rotor poles resulting in a high fundamental excitation frequency when operated at high-speed. For some high speeds, the fundamental frequency may not be attainable with today's power electronic converters.

To reduce the fundamental frequency for a given rotational speed, the number of rotor poles should be as small as possible. The minimum number of stator slots is six for a three-phase machine since it should be an even number and also a multiple of three. The number of rotor poles can be 4, 5, 7, 8, etc. Previously, not all of these combinations are suitable for practical use due to issues such as an unbalanced back-electromotive force (EMF) and unbalanced rotor force.

SUMMARY

In an example embodiment, an electric machine includes, but is not limited to, a rotor, a first stator, a second stator, a first plurality of permanent magnets, a second plurality of permanent magnets, a first winding, a second winding, a third winding, and a fourth winding. The rotor includes, but is not limited to, a rotor core having a first face and a second face, a first plurality of poles mounted to extend from the first face, and a second plurality of poles mounted to extend from the second face. The second face faces in a direction opposite to the first face. An aperture is formed through the first face and the second face.

The first stator includes, but is not limited to, a first plurality of core pieces, wherein each core piece of the first plurality of core pieces includes a slot having a first sidewall and a second sidewall. The second stator includes, but is not limited to, a second plurality of core pieces, wherein each core piece of the second plurality of core pieces includes a slot having a first sidewall and a second sidewall. A permanent magnet of the first plurality of permanent magnets is mounted between the first sidewall and the second sidewall of adjacent core pieces of the first plurality of core pieces. A permanent magnet of the second plurality of permanent magnets is mounted between the first sidewall and the second sidewall of adjacent core pieces of the second plurality of core pieces.

The first winding is wound over the first sidewall of a first core piece of the first plurality of core pieces, over a first permanent magnet of the first plurality of permanent magnets mounted between the first sidewall of the first core piece and the second sidewall of a second core piece of the first plurality of core pieces, and over the second sidewall of the second core piece of the first plurality of core pieces, wherein the first core piece and the second core piece of the first plurality of core pieces are adjacent to each other. The second winding is wound over the second sidewall of a third core piece of the first plurality of core pieces, over a second permanent magnet of the first plurality of permanent magnets mounted between the second sidewall of the third core piece and the first sidewall of a fourth core piece of the first plurality of core pieces, and over the first sidewall of the fourth core piece of the first plurality of core pieces, wherein the third core piece and the fourth core piece of the first plurality of core pieces are adjacent to each other. The third winding is wound over the first sidewall of a first core piece of the second plurality of core pieces, over a first permanent magnet of the second plurality of permanent magnets mounted between the first sidewall of the first core piece and the second sidewall of a second core piece of the second plurality of core pieces, and over the second sidewall of the second core piece of the second plurality of core pieces, wherein the first core piece and the second core piece of the second plurality of core pieces are adjacent to each other. The fourth winding is wound over the second sidewall of a third core piece of the second plurality of core pieces, over a second permanent magnet of the second plurality of permanent magnets mounted between the second sidewall of the third core piece and the first sidewall of a fourth core piece of the second plurality of core pieces, and over the first sidewall of the fourth core piece of the second plurality of core pieces, wherein the third core piece and the fourth core piece of the second plurality of core pieces are adjacent to each other. The first winding is closer to the third winding than to the fourth winding.

The first stator is mounted axially relative to the rotor so that a first air gap separates the first plurality of poles from the first winding and the second winding. The second stator is mounted axially relative to the rotor so that a second air gap separates the second plurality of poles from the third winding and the fourth winding. The first permanent magnet of the first plurality of permanent magnets and the second permanent magnet of the first plurality of permanent magnets have opposite polarities. The first permanent magnet of the second plurality of permanent magnets and the second permanent magnet of the second plurality of permanent magnets have opposite polarities. The first winding, the second winding, the third winding, and the fourth winding are connected in series. An absolute value of an angle offset between the first winding and the third winding and between closest poles of the first plurality of poles and the second plurality of poles is 180 electrical degrees.

In another example embodiment, an electric machine includes, but is not limited to, a first rotor, a second rotor, a stator, a plurality of permanent magnets, a first winding, a second winding, a third winding, and a fourth winding. The first rotor includes, but is not limited to, a first rotor core and a first plurality of poles. The first rotor core has a first face and a second face, wherein the second face faces in a direction opposite to the first face. An aperture is formed through the first face and the second face. The first plurality of poles is mounted to extend from the first face of the first rotor core. The second rotor includes, but is not limited to, a second rotor core and a second plurality of poles. The second rotor core has a first face and a second face, wherein the second face faces in a direction opposite to the first face. An aperture is formed through the first face and the second face. The first face of the first rotor core is in a same direction as the first face of the second rotor core. The second plurality of poles is mounted to extend from the second face of the second rotor core.

The stator includes, but is not limited to, a first plurality of core pieces and a second plurality of core pieces. Each core piece of the first plurality of core pieces and of the second plurality of core pieces includes a slot having a first sidewall and a second sidewall. The first plurality of core pieces face towards the first plurality of poles and the second plurality of core pieces face towards the second plurality of poles. A permanent magnet of the plurality of permanent magnets is mounted between the first sidewall and the second sidewall of adjacent core pieces of the first plurality of core pieces and between the first sidewall and the second sidewall of adjacent core pieces of the second plurality of core pieces.

The first winding is wound over the first sidewall of a first core piece of the first plurality of core pieces, over a first permanent magnet of the plurality of permanent magnets mounted between the first sidewall of the first core piece and the second sidewall of a second core piece of the first plurality of core pieces, and over the second sidewall of the second core piece of the first plurality of core pieces, wherein the first core piece and the second core piece of the first plurality of core pieces are adjacent to each other. The second winding is wound over the second sidewall of a third core piece of the first plurality of core pieces, over a second permanent magnet of the plurality of permanent magnets mounted between the second sidewall of the third core piece and the first sidewall of a fourth core piece of the first plurality of core pieces, and over the first sidewall of the fourth core piece of the first plurality of core pieces, wherein the third core piece and the fourth core piece of the first plurality of core pieces are adjacent to each other. The third winding is wound over the first sidewall of a first core piece of the second plurality of core pieces, over the first permanent magnet of the plurality of permanent magnets mounted between the first sidewall of the first core piece and the second sidewall of a second core piece of the second plurality of core pieces, and over the second sidewall of the second core piece of the second plurality of core pieces, wherein the first core piece and the second core piece of the second plurality of core pieces are adjacent to each other. The fourth winding is wound over the second sidewall of a third core piece of the second plurality of core pieces, over the second permanent magnet of the plurality of permanent magnets mounted between the second sidewall of the third core piece and the first sidewall of a fourth core piece of the second plurality of core pieces, and over the first sidewall of the fourth core piece of the second plurality of core pieces, wherein the third core piece and the fourth core piece of the second plurality of core pieces are adjacent to each other. The first winding is closer to the third winding than to the fourth winding;

The stator is mounted axially between the first rotor and the second rotor so that a first air gap separates the first plurality of poles from the first winding and the second winding and a second air gap separates the second plurality of poles from the third winding and the fourth winding. The first permanent magnet of the plurality of permanent magnets and the second permanent magnet of the first plurality of permanent magnets have opposite polarities. The first winding, the second winding, the third winding, and the fourth winding are connected in series. The second plurality of poles is rotated 180 electrical degrees relative to the first plurality of poles.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 4 depicts a perspective view of a left stator core of the AFSPM of FIG. 1 in accordance with an illustrative embodiment.

FIG. 5 depicts a perspective view of a right stator core of the AFSPM of FIG. 1 in accordance with an illustrative embodiment.

FIG. 20 depicts a perspective view of a fourth AFSPM in accordance with an illustrative embodiment.

DETAILED DESCRIPTION

Figure 1:
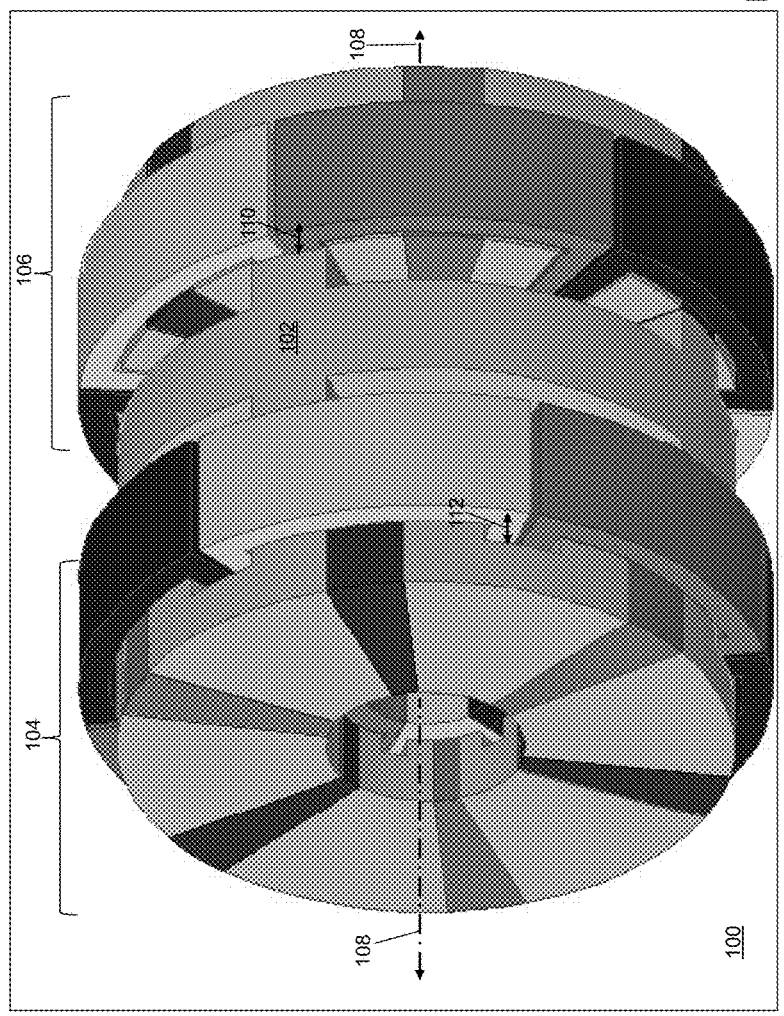
FIG. 1 depicts a perspective view of an axial flux switching permanent magnet machine (AFSPM) in accordance with an illustrative embodiment.

Referring to FIG. 1, a perspective view of an axial flux switching permanent magnet machine (AFSPM) 100 is shown in accordance with an illustrative embodiment. AFSPM 100 may include a rotor 102, a left stator 104, and a right stator 106. In the illustrative embodiment, AFSPM 100 is a three-phase machine that can be configured as a generator or as a motor as understood by a person of skill in the art. In alternative embodiments, AFSPM 100 can be configured to support a fewer or a greater number of phases.

Use of directional terms, such as top, bottom, right, left, front, back, upper, lower, horizontal, vertical, behind, etc. are merely intended to facilitate reference to the various surfaces of the described structures relative to the orientations shown in the drawings and are not intended to be limiting in any manner unless otherwise indicated.

AFSPM 100 may be used in various orientations. A shaft (not shown) may be mounted to extend parallel to a center axis 108. Center axis 108 extends through a center of rotor 102, left stator 104, and right stator 106 such that rotor 102, left stator 104, and right stator 106 are arranged concentrically around the shaft when AFSPM 100 is mounted to the shaft.

Figure 2:
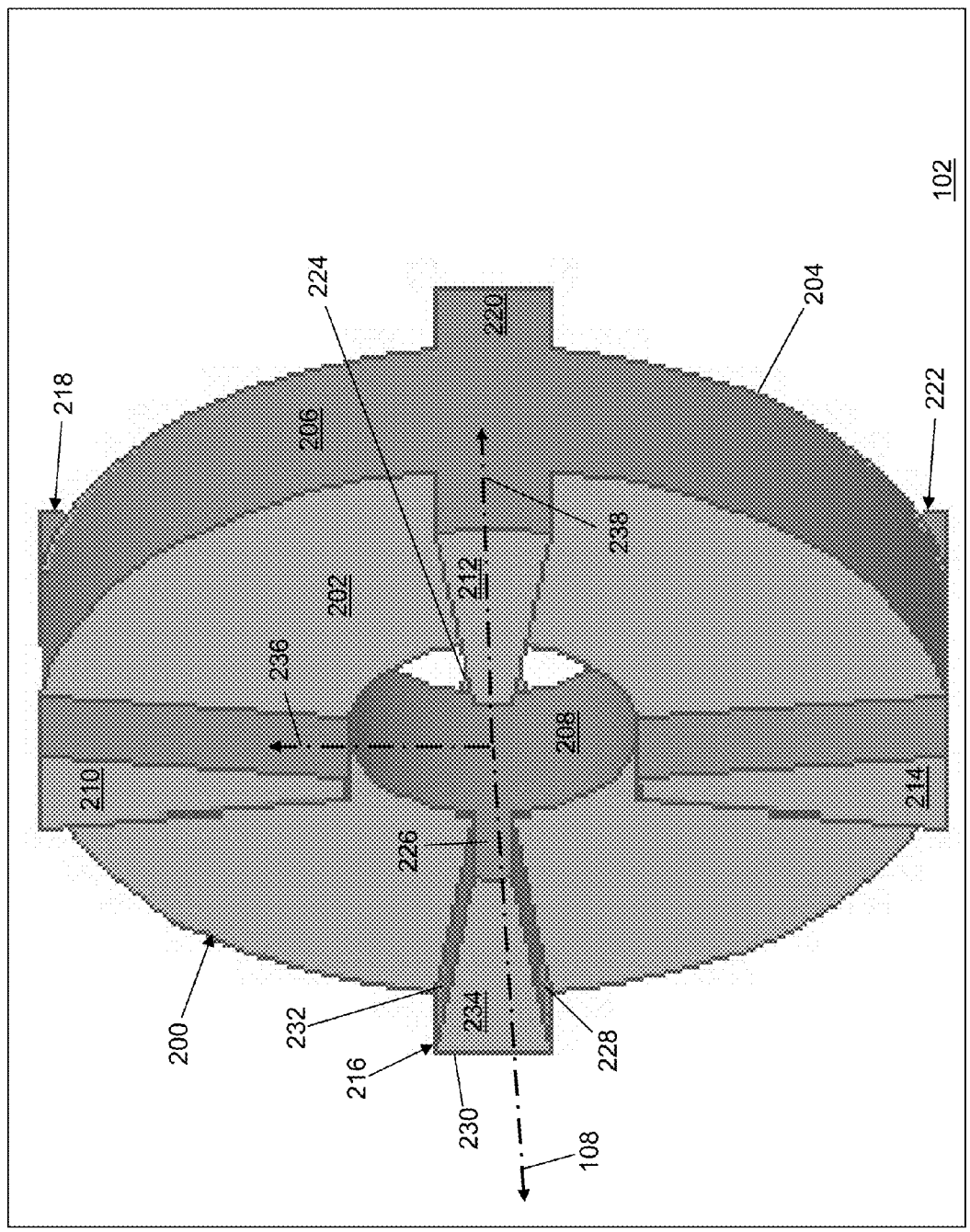
FIG. 2 depicts a perspective view of a rotor of the AFSPM of FIG. 1 in accordance with an illustrative embodiment.

Rotor 102 is mounted to the shaft for rotation as understood by a person of skill in the art. Rotor 102 may be formed of a ferromagnetic material such as lamination steel, iron, cobalt, nickel, etc. as understood by a person of skill in the art. Referring to FIG. 2, rotor 102 may include a rotor core 200, a left plurality of poles, and a right plurality of poles. A number of rotor poles, $p_{r1}$, of the left plurality of poles equals a number of rotor poles, $p_{r2}$, of the right plurality of poles. The number of rotor poles may depend on the number of phases supported by AFSPM 100. In the illustrative embodiment, $p_{r1}=p_{r2}=4$, though other numbers of rotor poles are possible. For example, the left plurality of poles may include a first left pole 210, a second left pole 212, a third left pole 214, and a fourth left pole 216. The right plurality of poles includes the same number of poles as the left plurality of poles. The right plurality of poles may include a first right pole 218, a second right pole 220, a third right pole 222, and a fourth right pole 224.

Rotor core 200 has a disc shape with an aperture through a center of the disc shape. Rotor core 200 may include a rotor left face 202, a rotor right face 204, a rotor exterior face 206, and a rotor interior face 208. Rotor left face 202 extends generally perpendicularly from first edges of rotor exterior face 206 and rotor interior face 208. Rotor right face 204 extends generally perpendicularly from second edges of rotor exterior face 206 and rotor interior face 208. Rotor left face 202 faces in a direction opposite rotor right face 204. Rotor left face 202 and rotor right face 204 are generally parallel to each other, flat, and disc-shaped such that the shaft extends through the aperture through a center of the disc shape formed by rotor interior face 208.

The left plurality of poles is distributed evenly around rotor left face 202, and the right plurality of poles is distributed evenly around rotor right face 204. As understood by a person of skill in the art, rotor core 200, the left plurality of poles, and the right plurality of poles may be laminations stacked in a radial direction. The laminations may be punched or laser cut.

The left plurality of poles extends generally perpendicularly outward from rotor left face 202. The right plurality of poles extends generally perpendicularly outward from rotor right face 204. The left and right pluralities of poles extend in alignment from rotor interior face 208 and from rotor exterior face 206. In the illustrative embodiment of FIG. 2, each pole of the left plurality of poles is aligned with a respective pole of the right plurality of poles. "Aligned with" indicates that each pair of left and right poles extends from the same point around the circumference of rotor 102 though the left and right poles extend in opposite directions.

The left plurality of poles and the right plurality of poles are distributed at equal angles around the circumference of rotor 102. For example, in the illustrative position shown in FIG. 2, first left pole 210 and first right pole 218 are positioned at 90 degrees, second left pole 212 and second right pole 220 are positioned at 0 degrees, third left pole 214 and third right pole 222 are positioned at −90 degrees, and fourth left pole 216 and fourth right pole 224 are positioned at 180 degrees relative to a vertical axis 236 that is perpendicular to center axis 108 and a third axis 238 that is perpendicular to both center axis 108 and vertical axis 236.

In the illustrative embodiment, each pole of the left and right pluralities of poles has the same shape and size and is formed of the same material. For illustration, fourth left pole 216 may include a pole interior face 226, a pole bottom face 228, a pole exterior face 230, a pole upper face 232 and a stator facing face 234. Pole interior face 226 extends from rotor interior face 208. Pole exterior face 230 extends from rotor exterior face 206. Stator facing face 234 is generally flat and parallel to rotor left face 202. Pole bottom face 228 extends between pole exterior face 230 and pole interior face 226, and pole top face 232 extends between pole exterior face 230 and pole interior face 226. Fourth left pole 216 has a truncated pie shape though other polygonal and or elliptical shapes may be used.

The components of rotor 102 may be integrally formed together or formed of one or more separate pieces that are mounted to each other. As used in this disclosure, the term "mount" further includes join, unite, connect, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact, but are mounted together via intermediate elements). Elements referenced as mounted to each other herein may further be integrally formed together, for example, using a molding process as understood by a person of skill in the art. As a result, elements described herein as being mounted to each other need not be discrete structural elements. The elements may be mounted permanently, removably, or releasably.

Figure 3:
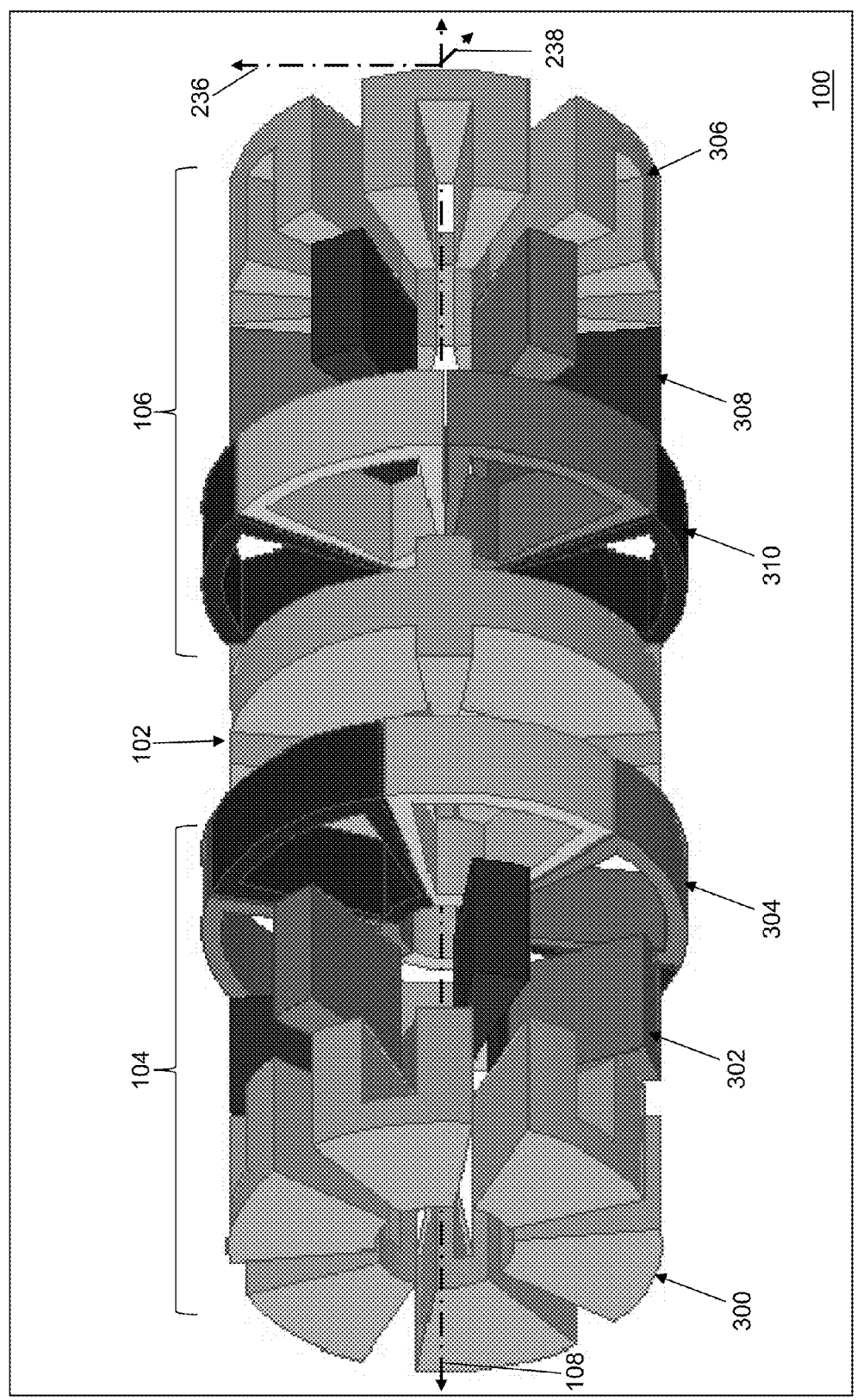
FIG. 3 depicts an exploded perspective view of the AFSPM of FIG. 1 in accordance with an illustrative embodiment.

Referring to FIG. 3, left stator 104 may include a left stator core 300, a left plurality of magnets 302, and a left plurality of windings 304. Right stator 106 may include a right stator core 306, a right plurality of magnets 308, and a right plurality of windings 310. Left stator 104 is positioned adjacent the left plurality of poles of rotor 102. Right stator 106 is positioned adjacent the right plurality of poles of rotor 102. Left stator 104 and right stator 106 have generally circular cross sections with a hollow core sized to accommodate the shaft that rotates rotor 102.

Referring again to FIG. 1, left stator 104 is mounted axially relative to rotor 102 and a first air gap (not shown) separates the left plurality of poles of rotor 102 from left stator 104. Right stator 106 is mounted axially relative to rotor 102 and a second air gap 110 separates the right plurality of poles of rotor 102 from right stator 106. The first air gap and second air gap 110 have the same width between the respective poles and stator.

Left stator core 300 and right stator core 306 may be formed of laminations stacked in a radial direction. The laminations may be punched or laser cut. Left stator core 300 and right stator core 306 may be formed of a ferromagnetic material such as lamination steel, iron, cobalt, nickel, etc. Referring to FIG. 4, left stator core 300 may include a first plurality of core pieces with two core pieces for each phase. In the illustrative three-phase embodiment, the first plurality of core pieces includes a first left core piece 400, a second left core piece 402, a third left core piece 404, a fourth left core piece 406, a fifth left core piece 408, and a sixth left core piece 410.

Referring to FIG. 5, right stator core 306 is identical to left stator core 300, but flipped 180 degrees relative to a plane defined by vertical axis 236 and third axis 238 that is perpendicular to center axis 108. Right stator core 306 may include a second plurality of core pieces, which include a first right core piece 500, a second right core piece 502, a third right core piece 504, a fourth right core piece 506, a fifth right core piece 508, and a sixth right core piece 510.

In the illustrative embodiment, each core piece of the first plurality of core pieces and the second plurality of core pieces has the same size and shape. The first plurality of core pieces and the second plurality of core pieces are arranged around center axis 108. In the illustrative embodiment, each core piece has a "C"-shape though an "E"-shape may also be used as understood by a person of skill in the art where the outside edges of the "E"-shape are similar to those described for the "C"-shape. The hollow of the C-shape of each core piece defines a stator slot within which the left plurality of windings 304 are mounted as described further below. In the illustrative embodiment, the number of stator slots, $p_{s1}$, of left stator 104 equals a number of stator slots, $p_{s2}$, of right stator 106. In the illustrative embodiment, $p_{s1}=p_{s2}=6$, though other numbers of stator slots are possible. The slots are distributed at equal angles around the circumference of left stator 104 and of right stator 106. For example, relative to the plane defined by vertical axis 236 and third axis 238, a center of first left core piece 400 is positioned at 75 degrees, a center of second first left core piece 402 is positioned at 15 degrees, a center of third first left core piece 404 is positioned at −45 degrees, a center of fourth left core piece 406 is positioned at −105 degrees, a center of fifth left core piece 408 is positioned at −165 degrees, and a center of sixth left core piece 410 is positioned at 135 degrees. A center of first right core piece 500 is positioned at 120 degrees, a center of second first right core piece 502 is positioned at 60 degrees, a center of third first right core piece 504 is positioned at 0 degrees, a center of fourth right core piece 506 is positioned at −60 degrees, a center of fifth right core piece 508 is positioned at −120 degrees, and a center of sixth right core piece 510 is positioned at 180 degrees.

Referring again to FIG. 4, second left core piece 402 may include a left exterior face 412, a bottom exterior face 414, a bottom, right exterior face 416, a bottom, top face 418, a right center face 420, a top, bottom face 422, a top, right exterior face 424, a top exterior face 426, an exterior circumferential face 428, and an interior circumferential face 430. The dimensions of the faces of second left core piece 402 may be relatively wider or narrower than that shown in FIG. 4. Exterior circumferential face 428 and interior circumferential face 430 have the C-shape and are curved circumferentially relative to center axis 108 though exterior circumferential face 428 and interior circumferential face 430 may have be flat in other embodiments. Exterior circumferential face 428 and interior circumferential face 430 further extend in the direction of the shaft about which AFSPM is mounted. Left exterior face 412, bottom, right exterior face 416, and top, right exterior face 424 extend generally parallel to each other and perpendicular to center axis 108 between exterior circumferential face 428 and interior circumferential face 430.

Bottom exterior face 414 extends between edges of interior circumferential face 430, left exterior face 412, exterior circumferential face 428, and bottom, right exterior face 416. Top exterior face 426 extends between edges of interior circumferential face 430, left exterior face 412, exterior circumferential face 428, and top, right exterior face 424. Bottom, right exterior face 416 extends between edges of interior circumferential face 430, bottom exterior face 414, exterior circumferential face 428, and bottom, top face 418. Top, right exterior face 424 extends between edges of interior circumferential face 430, top exterior face 426, exterior circumferential face 428, and top, bottom face 422. Right center face 420 extends between edges of interior circumferential face 430, bottom, top face 418, exterior circumferential face 428, and top, bottom face 422. Left exterior face 412, bottom, right exterior face 416, top, right exterior face 424, and right center face 420 are parallel and extend generally perpendicular from exterior circumferential face 428 and interior circumferential face 430. Left exterior face 412, bottom, right exterior face 416, top, right exterior face 424, and right center face 420 have a truncated pie shape though other polygonal and or elliptical shapes may be used. Bottom, right exterior face 416, top, right exterior face 424, and right center face 420 face outwards from left stator core 300 in an opposite direction to left exterior face 412. Bottom, right exterior face 416 and top, right exterior face 424 face the left plurality of poles of rotor 102 when AFSPM 100 is formed. Bottom exterior face 414, bottom, top face 418, top, bottom face 422, and top exterior face 426 are generally rectangular.

Referring again to FIG. 5, third right core piece 504 of right stator core 306 similarly may include a right exterior face 512, a bottom exterior face 514, a bottom, left exterior face 516, a bottom, top face 518, a left center face 520, a top, bottom face 522, a top, left exterior face 524, a top exterior face 526, an exterior circumferential face 528, and an interior circumferential face 530.

Bottom, top face 418, right center face 420, and top, bottom face 422 form a slot. Top, bottom face 422, top, right exterior face 424, and top exterior face 426 form a first sidewall of the slot formed by each core piece of the first plurality of core pieces. Bottom exterior face 414, a bottom, right exterior face 416, a bottom, top face 418 form a second sidewall of the slot formed by each core piece of the first plurality of core pieces.

Bottom, top face 518, left center face 520, and top, bottom face 522 form a slot. Top, bottom face 522, top, left exterior face 524, and top exterior face 526 form a first sidewall of the slot formed by each core piece of the second plurality of core pieces. Bottom exterior face 514, a bottom, left exterior face 516, a bottom, top face 518 form a second sidewall of the slot formed by each core piece of the second plurality of core pieces.

Figure 6:
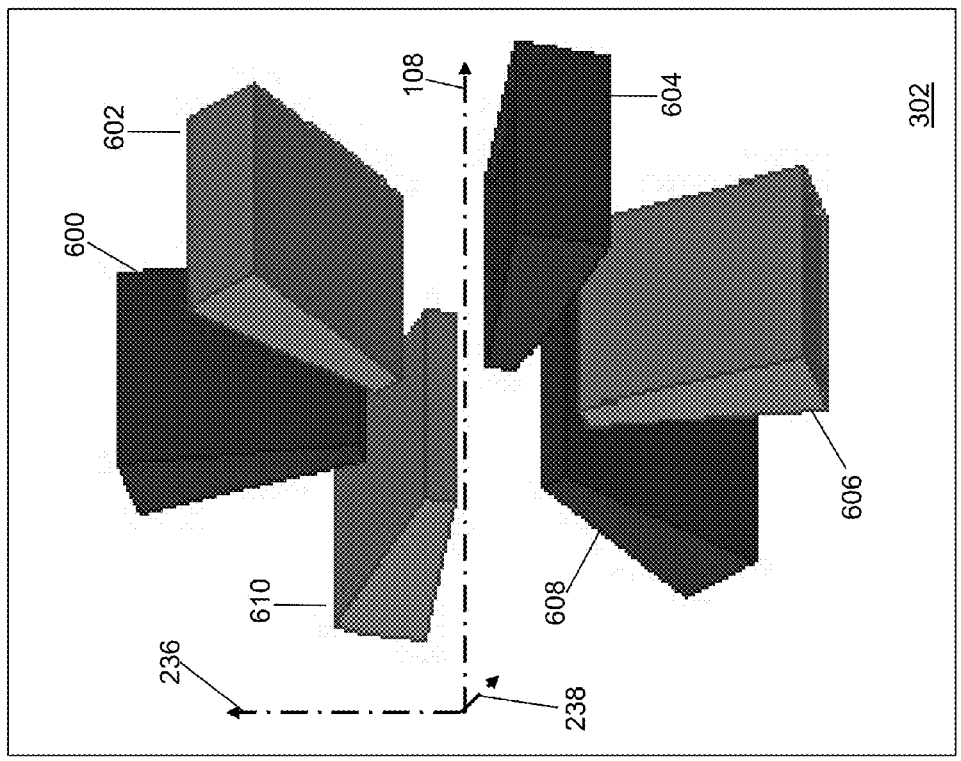
FIG. 6 depicts a perspective view of a left plurality of magnets of the AFSPM of FIG. 1 in accordance with an illustrative embodiment.

Referring to FIG. 6, the left plurality of magnets 302 includes two magnets for each phase. In the illustrative three-phase embodiment, the left plurality of magnets 302 includes a first left magnet 600, a second left magnet 602, a third left magnet 604, a fourth left magnet 606, a fifth left magnet 608, and a sixth left magnet 610. Each magnet of the left plurality of magnets 302 and the right plurality of magnets 308 is magnetized to form a south (S) pole on a first side and a north (N) pole on a second side opposite the first side, wherein the magnetization direction is in a radial direction from the first side to the second side of the magnet. The left plurality of magnets 302 are mounted with N poles adjacent N poles and S poles adjacent S poles to form pole pairs. Thus, first left magnet 600, third left magnet 604, and fifth left magnet 608 have an opposite N-S polarity relative to second left magnet 602, fourth left magnet 606, and sixth left magnet 610. For illustration, first left magnet 600 and second left magnet 602 form a first pole pair. The pole pairs are formed at a regular pitch circumferentially around left stator 104. In the illustrative embodiment, first left magnet 600, third left magnet 604, and fifth left magnet 608 have N-S polarity and second left magnet 602, fourth left magnet 606, and sixth left magnet 610 have S-N polarity.

First left magnet 600, second left magnet 602, third left magnet 604, fourth left magnet 606, fifth left magnet 608, and sixth left magnet 610 have a truncated pie shape that is sized to fit in slots formed between adjacent core pieces of the first plurality of core pieces. First left magnet 600, second left magnet 602, third left magnet 604, fourth left magnet 606, fifth left magnet 608, and sixth left magnet 610 may have other polygonal and or elliptical shapes in alternative embodiments. For example, second left magnet 602 is mounted in a slot formed between first left core piece 400 and second left core piece 402, more specifically between top exterior face 426 of second left core piece 402 and bottom exterior face 414 of first left core piece 400. Similarly, third left magnet 604 is mounted in a slot formed between second left core piece 402 and third left core piece 404; fourth left magnet 606 is mounted in a slot formed between third left core piece 404 and fourth left core piece 406; fifth left magnet 608 is mounted in a slot formed between fourth left core piece 406 and fifth left core piece 408; sixth left magnet 610 is mounted in a slot formed between fifth left core piece 408 and sixth left core piece 410; and first left magnet 600 is mounted in a slot formed between sixth left core piece 410 and first left core piece 400. For example, relative to the plane defined by vertical axis 236 and third axis 238, a center of first left magnet 600 is positioned at 105 degrees, a center of second left magnet 602 is positioned at 45 degrees, a center of third left magnet 604 is positioned at −15 degrees, a center of fourth left magnet 606 is positioned at −75 degrees, a center of fifth left magnet 608 is positioned at −135 degrees, and a center of sixth left magnet 610 is positioned at 165 degrees.

Figure 7:
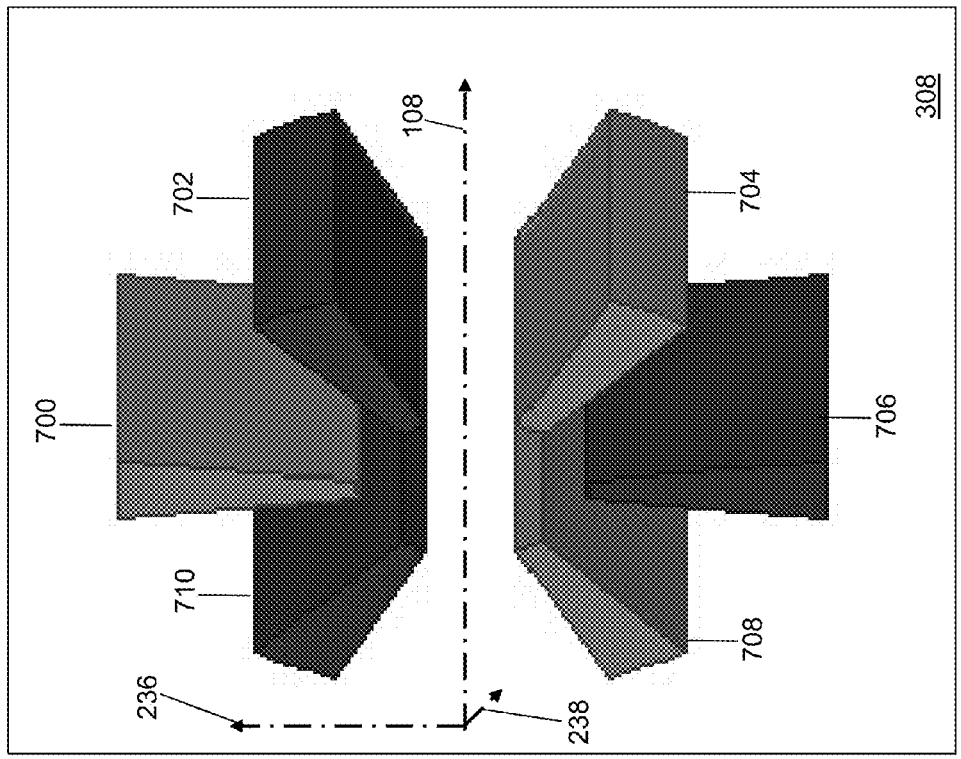
FIG. 7 depicts a perspective view of a right plurality of magnets of the AFSPM of FIG. 1 in accordance with an illustrative embodiment.

Similarly, referring to FIG. 7, the right plurality of magnets 308 includes two magnets for each phase. In the illustrative three-phase embodiment, the right plurality of magnets 308 includes a first right magnet 700, a second right magnet 702, a third right magnet 704, a fourth right magnet 706, a fifth right magnet 708, and a sixth right magnet 710. The right plurality of magnets 308 are mounted with N poles adjacent N poles and S poles adjacent S poles to form pole pairs. Thus, first right magnet 700, third right magnet 704, and fifth right magnet 708 have an opposite N-S polarity relative to second right magnet 702, fourth right magnet 706, and sixth right magnet 710. For illustration, first right magnet 700 and second right magnet 702 form a first pole pair. The pole pairs are formed at a regular pitch circumferentially around right stator 106. In the illustrative embodiment, first right magnet 700, third right magnet 704, and fifth right magnet 708 have S-N or opposite N-S polarity and second right magnet 702, fourth right magnet 706, and sixth right magnet 710 have N-S polarity.

First right magnet 700, second right magnet 702, third right magnet 704, fourth right magnet 706, fifth right magnet 708, and sixth right magnet 710 have a truncated pie shape that is sized to fit between adjacent core pieces of the second plurality of core pieces. First right magnet 700, second right magnet 702, third right magnet 704, fourth right magnet 706, fifth right magnet 708, and sixth right magnet 710 may have other polygonal and or elliptical shapes in alternative embodiments. For example, second right magnet 702 is mounted in a slot formed between second right core piece 502 and third right core piece 504, more specifically between top exterior face 526 of third right core piece 504 and bottom exterior face 514 of second right core piece 502. Similarly, third right magnet 704 is mounted in a slot formed between third right core piece 504 and fourth right core piece 506; fourth right magnet 706 is mounted in a slot formed between fourth right core piece 506 and fifth right core piece 508; fifth right magnet 708 is mounted in a slot formed between fifth right core piece 508 and sixth right core piece 510; sixth right magnet 710 is mounted in a slot formed between sixth right core piece 510 and first right core piece 500; and first right magnet 700 is mounted in a slot formed between first right core piece 500 and second right core piece 502. For example, relative to the plane defined by vertical axis 236 and third axis 238, a center of first right magnet 700 is positioned at 90 degrees, a center of second right magnet 702 is positioned at 30 degrees, a center of third right magnet 704 is positioned at −30 degrees, a center of fourth right magnet 706 is positioned at −90 degrees, a center of fifth right magnet 708 is positioned at −150 degrees, and a center of sixth right magnet 710 is positioned at 150 degrees.

In the arrangement shown in the illustrative embodiment of FIG. 1, first left magnet 600 has an opposite N-S polarity relative to first right magnet 700. The left plurality of magnets 302 and the right plurality of magnets 308 are permanent magnets that may be formed of rare earth magnets, such as neodymium and dysprosium, of ferrite based magnets, etc. The left plurality of magnets 302 and the right plurality of magnets 308 are electrically isolated from each other. First left magnet 600 may have the same N-S polarity relative to first right magnet 700 if current direction on the right plurality of windings 310 is reversed relative to that shown in FIG. 12.

Figure 8:
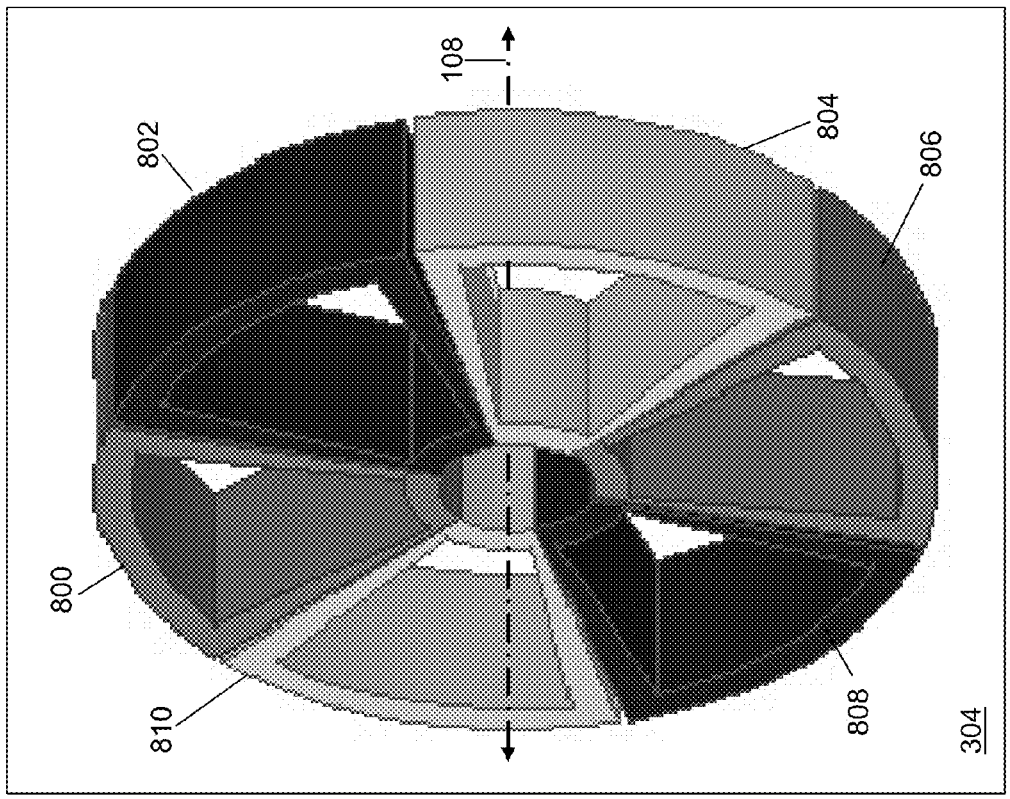
FIG. 8 depicts a perspective view of a left plurality of stator windings of the AFSPM of FIG. 1 in accordance with an illustrative embodiment.

Referring to FIG. 8, the left plurality of windings 304 includes two windings for each phase. In the illustrative embodiment, each winding of the left plurality of windings 304 is trapezoidal and concentrated though other winding configurations may be used. In the illustrative three-phase embodiment, the left plurality of windings 304 includes a first left winding 800, a second left winding 802, a third left winding 804, a fourth left winding 806, a fifth left winding 808, and a sixth left winding 810. First left winding 800 and fourth left winding 806 are connected to receive a second phase. Second left winding 802 and fifth left winding 808 are connected to receive a third phase. Third left winding 804 and sixth left winding 810 are connected to receive a first phase. The first phase, the second phase, and the third phase are separated by 360/N or 120 degrees in the illustrative three-phase embodiment, where N is the number of phases. The first phase may be denoted as an "A"-phase; the second phase may be denoted as a "B"-phase; and the third phase may be denoted as a "C"-phase.

The left plurality of windings 304 mount through the slot formed by the hollow part of the C-shape of two adjacent core pieces such that each winding extends over a different magnet of the left plurality of magnets 302. As an example, second left winding 802 is wound over a bottom portion of interior circumferential face 430, over bottom, top face 418, and over a bottom portion of exterior circumferential face 428 of first core piece 400, over an exterior facing side of second left magnet 602, over a top portion of exterior circumferential face 428, over top, bottom face 422, and over a top portion of interior circumferential face 430 of second core piece 402, and over an interior facing side of second left magnet 602. Thus, second left winding 802 is wound over the second sidewall of the slot formed by first core piece 400, over second left magnet 602, and over the first sidewall of the slot formed by second core piece 402.

Each additional winding is similarly wound around respective core pieces and magnets. For example, third left winding 804 is similarly wound over second core piece 402, third left magnet 604, and third core piece 404; fourth left winding 806 is similarly wound over third core piece 404, fourth left magnet 606, and fourth core piece 406; fifth left winding 808 is similarly wound over fourth core piece 406, fifth left magnet 608, and fifth core piece 408; sixth left winding 810 is similarly wound over fifth core piece 408, sixth left magnet 610, and sixth core piece 410; and first left winding 800 is similarly wound over sixth core piece 410, first left magnet 600, and first core piece 400.

Figure 9:
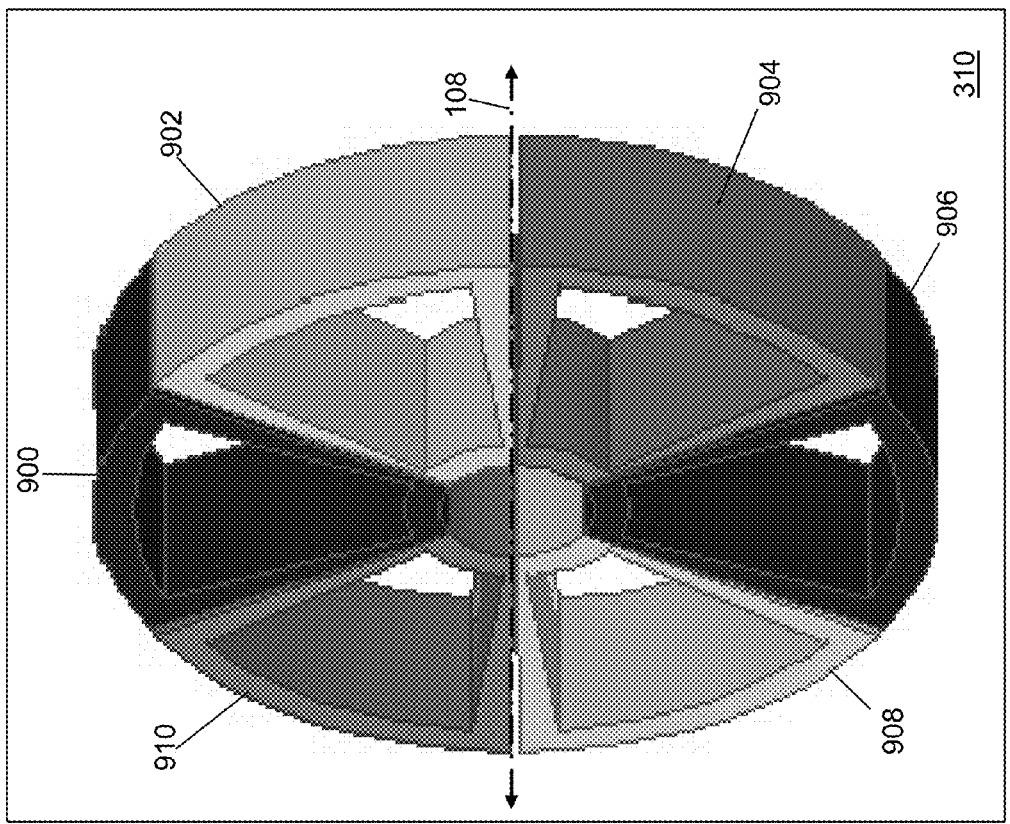
FIG. 9 depicts a perspective view of a right plurality of windings of the AFSPM of FIG. 1 in accordance with an illustrative embodiment.

Referring to FIG. 9, similar to the left plurality of windings 302, the right plurality of windings 310 includes two windings for each phase where each winding is trapezoidal and concentrated. In the illustrative three-phase embodiment, the right plurality of windings 310 includes a first right winding 900, a second right winding 902, a third right winding 904, a fourth right winding 906, a fifth right winding 908, and a sixth right winding 910. In the illustrative embodiment, first right winding 900 and fourth right winding 906 are connected to receive the third phase; second right winding 902 and fifth right winding 908 are connected to receive the first phase; and third right winding 904 and sixth right winding 910 are connected to receive the second phase.

The right plurality of windings 310 mount through the slot formed by the hollow part of the C-shape of two adjacent core pieces such that each winding extends over a different magnet of the right plurality of magnets 308. As an example, second right winding 902 is wound over a bottom portion of interior circumferential face 530, over bottom, top face 518, and over a bottom portion of exterior circumferential face 528 of second core piece 502, over an exterior facing side of second right magnet 702, over a top portion of exterior circumferential face 528, over top, bottom face 522, and over a top portion of interior circumferential face 530 of third core piece 504, and over an interior facing side of second right magnet 702. Thus, second right winding 902 is wound over the second sidewall of the slot formed by second core piece 502, over second right magnet 702, and over the first sidewall of the slot formed by third core piece 504.

Each additional winding is similarly wound over respective core pieces and magnets. For example, third right winding 904 is similarly wound over third core piece 504, third right magnet 704, and fourth core piece 506; fourth right winding 906 is similarly wound over fourth core piece 506, fourth right magnet 706, and fifth core piece 508; fifth right winding 908 is similarly wound over fifth core piece 508, fifth right magnet 708, and sixth core piece 510; sixth right winding 910 is similarly wound over sixth core piece 510, sixth right magnet 710, and first core piece 500; and first right winding 900 is similarly wound over first core piece 500, first right magnet 700, and second core piece 502.

Referring again to FIG. 1, an insulation gap 112 may separate the left plurality of windings 304 from the first plurality of core pieces of left stator 104. Insulation may be mounted within insulation gap 112. Similar insulation gaps may be formed between each winding of the left plurality of windings 304 and respective core pieces of the first plurality of core pieces of left stator 104. Similarly, insulation gaps may be formed between each winding of the right plurality of windings 310 and respective core pieces of the second plurality of core pieces of right stator 106.

Figure 11:
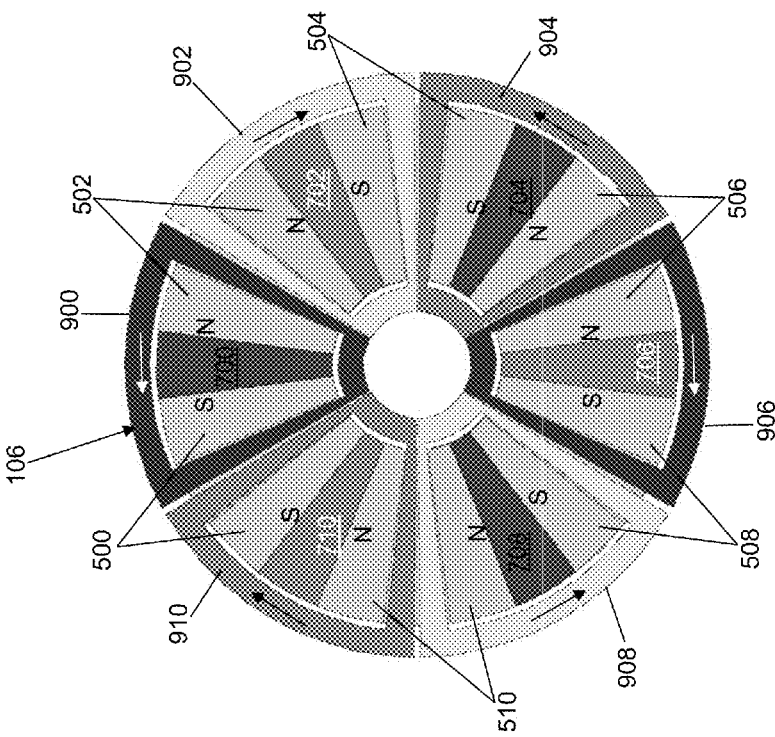
FIG. 11 depicts a left to right side view of a right stator of the AFSPM of FIG. 1 in accordance with an illustrative embodiment.
Figure 10:
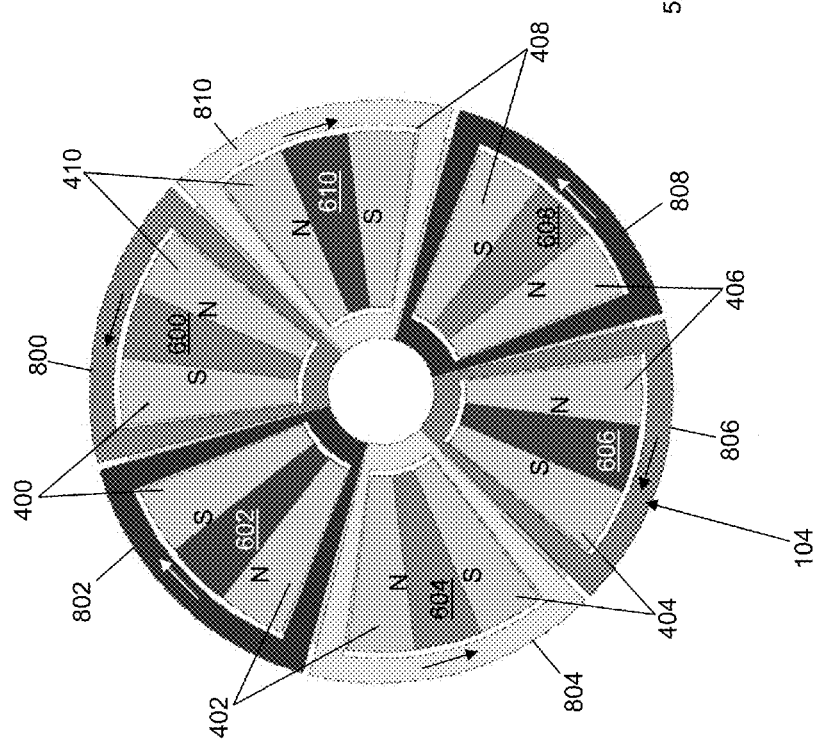
FIG. 10 depicts a right to left side view of a left stator of the AFSPM of FIG. 1 in accordance with an illustrative embodiment.

Referring to FIG. 10, a right to left view of left stator 104 is shown in accordance with an illustrative embodiment. For illustration, a N-S polarity is indicated for each magnet of the left plurality of magnets 302. For illustration, an arrow also shows a direction of positive current in each winding of the left plurality of windings 304. Referring to FIG. 11, a left to right view of right stator 106 is shown in accordance with an illustrative embodiment. For illustration, a N-S polarity is indicated for each magnet of the right plurality of magnets 308. For illustration, an arrow also shows a direction of positive current in each winding of the right plurality of windings 310.

In the illustrative embodiment, AFSPM 100 includes three-phase windings that are tied together. For example, referring to FIG. 12, in an illustrative embodiment, the left plurality of windings 304 and the right plurality of windings 310 are tied together at a central connection point 1208 to form a "Y" configuration. Sixth left winding 810 is connected between a first connection point 1200 and a second connection point 1202. Third left winding 804 is connected between second connection point 1202 and a third connection point 1204. Second right winding 902 is connected between third connection point 1204 and a fourth connection point 1206. Fifth right winding 908 is connected between fourth connection point 1206 and central connection point 1202. Thus, sixth left winding 810, third left winding 804, second right winding 902, and fifth right winding 908 are connected in series between first connection point 1200 and central connection point 1208, where the "+" indicates positive current flow with the first phase from first connection point 1200 to central connection point 1208 such that each of sixth left winding 810, third left winding 804, second right winding 902, and fifth right winding 908 can be referred to as a positive winding.

Fourth left winding 806 is connected between a fifth connection point 1210 and a sixth connection point 1212. First left winding 800 is connected between sixth connection point 1212 and a seventh connection point 1214. Third right winding 904 is connected between seventh connection point 1214 and an eighth connection point 1216. Sixth right winding 910 is connected between eighth connection point 1216 and central connection point 1208. Thus, fourth left winding 806, first left winding 800, third right winding 904, and sixth right winding 910 are connected in series between fifth connection point 1210 and central connection point 1208, where the "+" indicates positive current flow with the second phase from fifth connection point 1210 to central connection point 1202 such that each of fourth left winding 806, first left winding 800, third right winding 904, and sixth right winding 910 can be referred to as a positive winding.

Second left winding 802 is connected between a ninth connection point 1218 and a tenth connection point 1220. Fifth left winding 808 is connected between tenth connection point 1220 and an eleventh connection point 1222. First right winding 900 is connected between eleventh connection point 1222 and a twelfth connection point 1224. Fourth right winding 906 is connected between twelfth connection point 1224 and central connection point 1208. Thus, second left winding 802, fifth left winding 808, first right winding 900, and fourth right winding 906 are connected in series between ninth connection point 1218 and central connection point 1202, where the "+" indicates positive current flow with the third phase from ninth connection point 1218 to central connection point 1208 such that each of second left winding 802, fifth left winding 808, first right winding 900, and fourth right winding 906 can be referred to as a positive winding.

Figure 13:
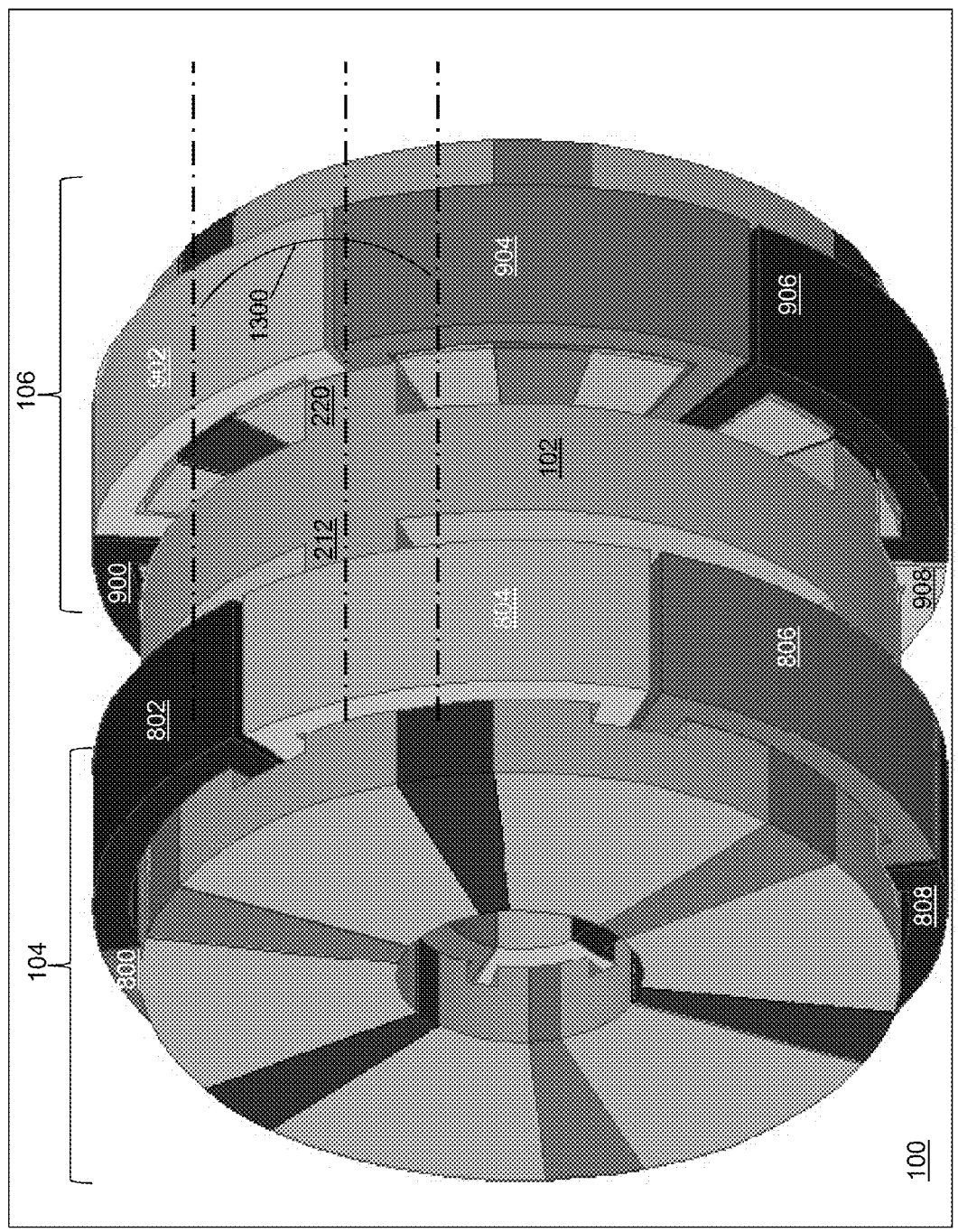
FIG. 13 depicts a second perspective view of the AFSPM of FIG. 1 in accordance with an illustrative embodiment.

Referring to FIG. 13, a perspective view of AFSPM 100 is shown again in accordance with an illustrative embodiment illustrating angles between the poles of rotor 102 and between the windings of left stator 104 and right stator 106. As stated previously, the left plurality of poles and the right plurality of poles of rotor 102 of AFSPM 100 are aligned so that a rotor angle $\theta_r=0$ in mechanical and electrical degrees. Third left winding 804 and second right winding 902 are offset by a stator angle 1300 of 45 mechanical degrees resulting in a stator shift $\theta_s$ of 180 electrical degrees or $\pi$ electrical radians because $\theta_{mech}=\theta_{elec}/p_{r1}$. Thus, an angular offset $\theta_{off}=|\theta_s-\theta_r|=|\pi-0|=\pi$ exists between the left and right plurality and poles of rotor 102 and the windings of left stator 104 and right stator 106.

Figure 14:
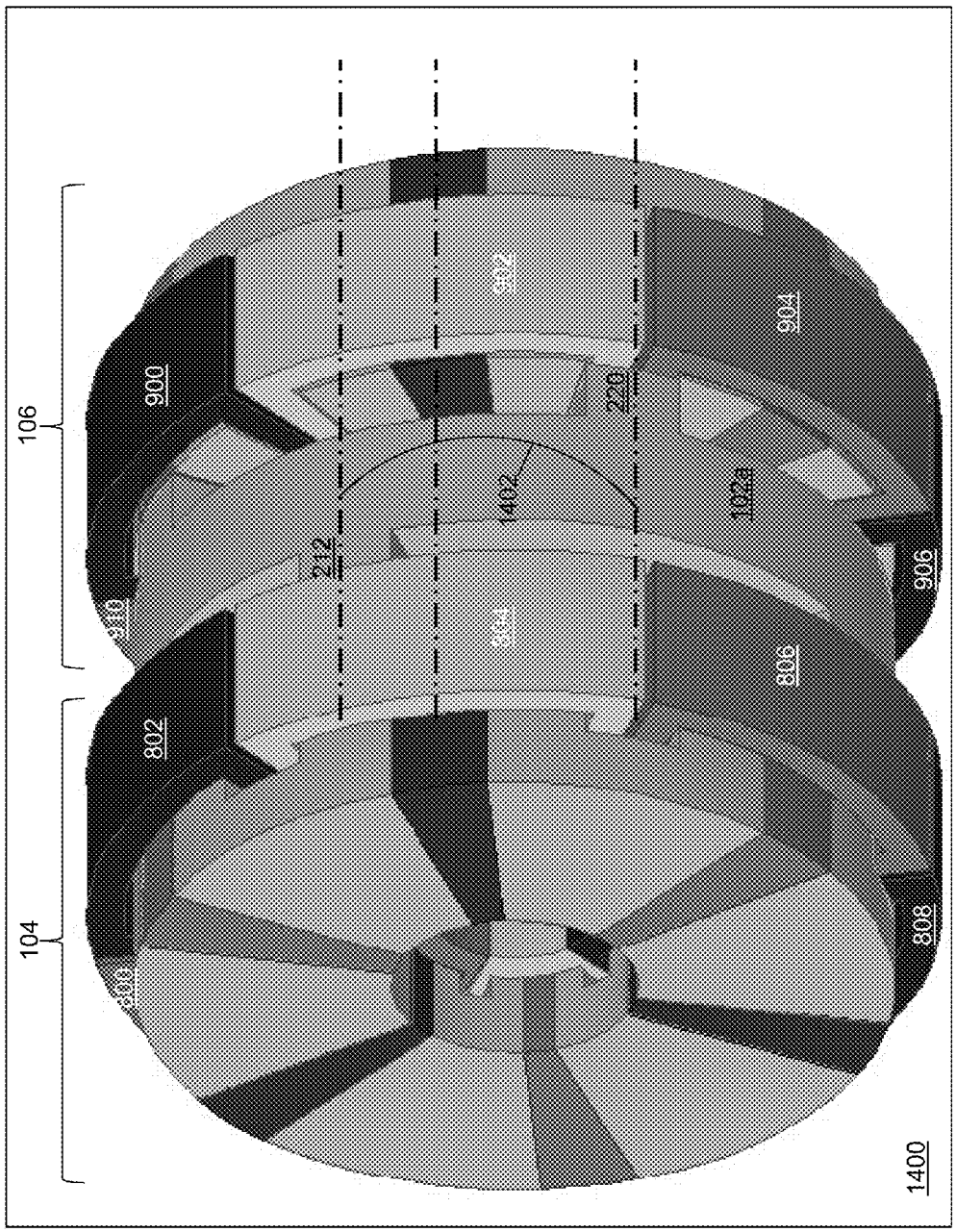
FIG. 14 depicts a perspective view of a second AFSPM in accordance with an illustrative embodiment.

Referring to FIG. 14, a perspective view of a second AFSPM 1400 is shown in accordance with a second illustrative embodiment. Second AFSPM 1400 may include a second rotor 102a, left stator 104, and right stator 106. In the illustrative embodiment, second AFSPM 1400 is a three-phase machine that can be configured as a generator or as a motor as understood by a person of skill in the art. In alternative embodiments, second AFSPM 1400 can be configured to support a fewer or a greater number of phases.

Second rotor 102a is identical to rotor 102 except that the right plurality of poles are rotated a rotor angle 1402 equal to 45 mechanical degrees or 180 electrical degrees relative to the left plurality of poles.

In comparison with AFSPM 100, right stator 106 of second AFSPM 1400 has also been rotated relative to left stator 104. Relative to the plane defined by vertical axis 236 and third axis 238, a center of first right core piece 500 is positioned at 75 degrees, a center of second first right core piece 502 is positioned at 15 degrees, a center of third first right core piece 504 is positioned at −45 degrees, a center of fourth right core piece 506 is positioned at −105 degrees, a center of fifth right core piece 508 is positioned at −165 degrees, and a center of sixth right core piece 510 is positioned at 135 degrees. Thus, right stator 106 of second AFSPM 1400 is rotated 45 mechanical degrees relative to right stator 106 of AFSPM 100.

Thus, for second AFSPM 1400, stator angle $\theta_s=0$ and a rotor angle $\theta_r$ equals 180 electrical degrees or $\pi$ electrical radians. Thus, the angular offset is $\theta_{off}=|\theta_s-\theta_r|=|0-\pi|=\pi$.

Figure 15:
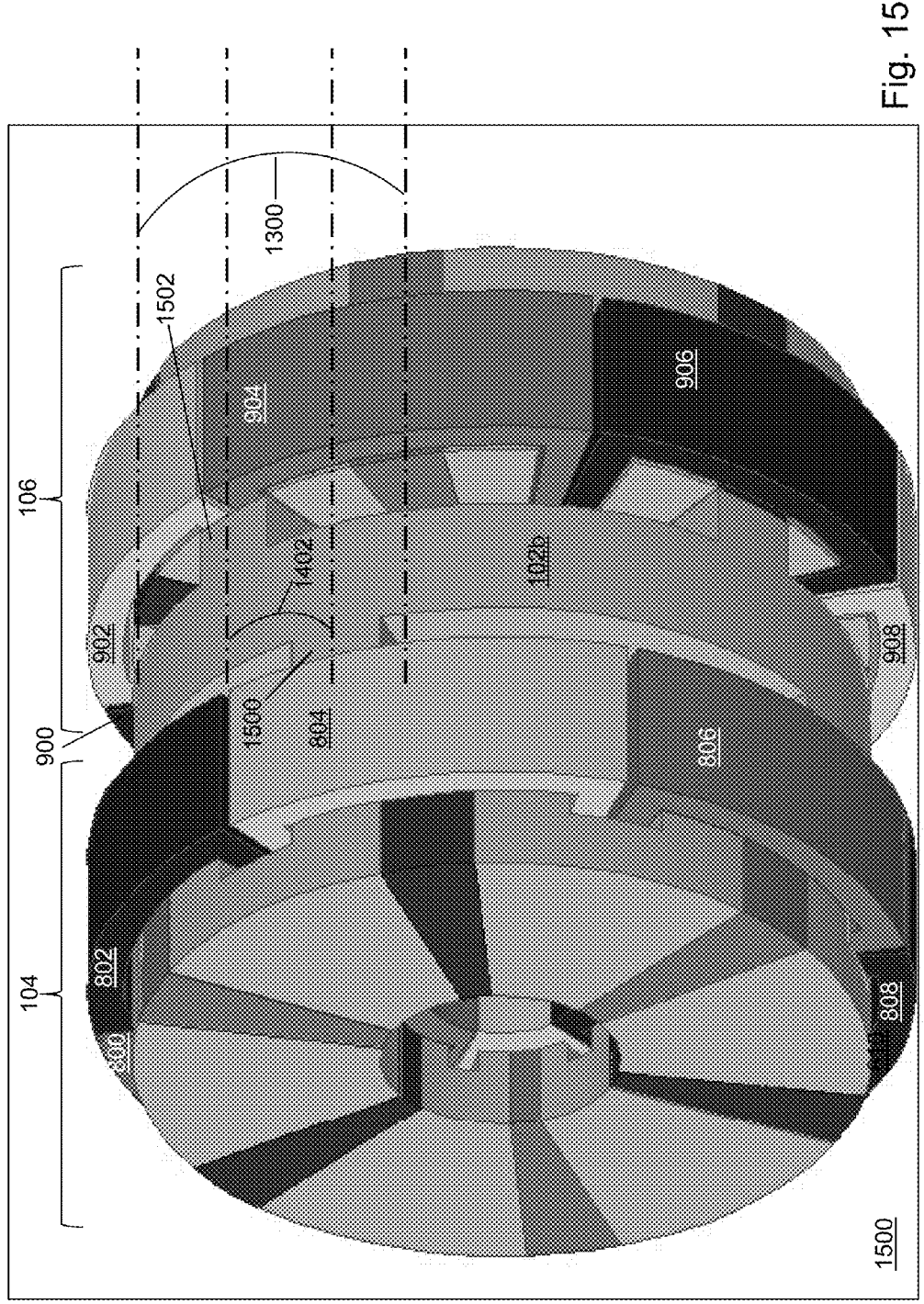
FIG. 15 depicts a perspective view of a third AFSPM in accordance with an illustrative embodiment.

Referring to FIG. 15, a perspective view of a third AFSPM 1500 is shown in accordance with a second illustrative embodiment. Third AFSPM 1500 may include a third rotor 102b, left stator 104, and right stator 106. In the illustrative embodiment, third AFSPM 1500 is a three-phase machine that can be configured as a generator or as a motor as understood by a person of skill in the art. In alternative embodiments, third AFSPM 1500 can be configured to support a fewer or a greater number of phases.

Third rotor 102b is identical to rotor 102 except that the right plurality of poles are rotated a second rotor angle 1500 relative to the left plurality of poles and, relative to AFSPM 100, right stator 106 of third AFSPM 1500 has been rotated a second stator angle 1502 such that the angular offset remains $\theta_{off}=|\theta_s-\theta_r|=\pi$ in electrical degrees. The left half of third AFSPM 1500 that includes left stator 104 and the left plurality of poles of third rotor 102b and the right half of third AFSPM 1500 that includes right stator 106 and the right plurality of poles of third rotor 102b can operate separately so that the left half and the right half can be shifted to any degree as long as the relationship $\theta_{off}=|\theta_s-\theta_r|=\pi$ is maintained. In the illustrative example, rotor angle 1402 is 15 mechanical degrees or 60 electrical degrees and stator angle 1300 is 60 mechanical degrees or 240 electrical degrees.

Each of AFSPM 100, second AFSPM 1400, and third AFSPM 1500 eliminate even order harmonic components of flux linkage. In a dual stator, single rotor AFSPM machine, a second flux linkage component is introduced because of an additional linkage between the second (right) stator and rotor 102. The total flux linkage can be defined as:

$$\lambda_a \approx \Lambda_1 \sin(p_r\theta_m) + \Lambda_2 \sin(2p_r\theta_m) + (-1)^k \Lambda_1 \sin(p_r\theta_m + \theta_{off}) + (-1)^k \Lambda_2 \sin(2p_r\theta_m + 2\theta_{off})$$

where $p_r$ is the number of rotor poles of the left plurality of poles and of the right plurality of poles of rotor 102, 102a, 102b. $\theta_{off}$ as described above is the electrical offset angle between the two flux linkages in radians and $\theta_m$ is the mechanical position of rotor 102, second rotor 102a, or third rotor 102b.

The total flux linkage becomes:

$$\lambda_a \approx -2\Lambda_1 \cos\left(p_r\theta_m + \frac{\theta_{off}}{2}\right)\sin\left(\frac{\theta_{off}}{2}\right) - 2\Lambda_2 \cos(2p_r\theta_m + \theta_{off})\sin(\theta_{off})$$

If $\theta_{off}$ is set to be $\pi$ radians electric, the total flux linkage becomes:

$$\lambda_a \approx 2\Lambda_1 \sin(p_r\theta_m)$$

As a result, the second order harmonic component of the total flux linkage is effectively eliminated.

Figure 16:
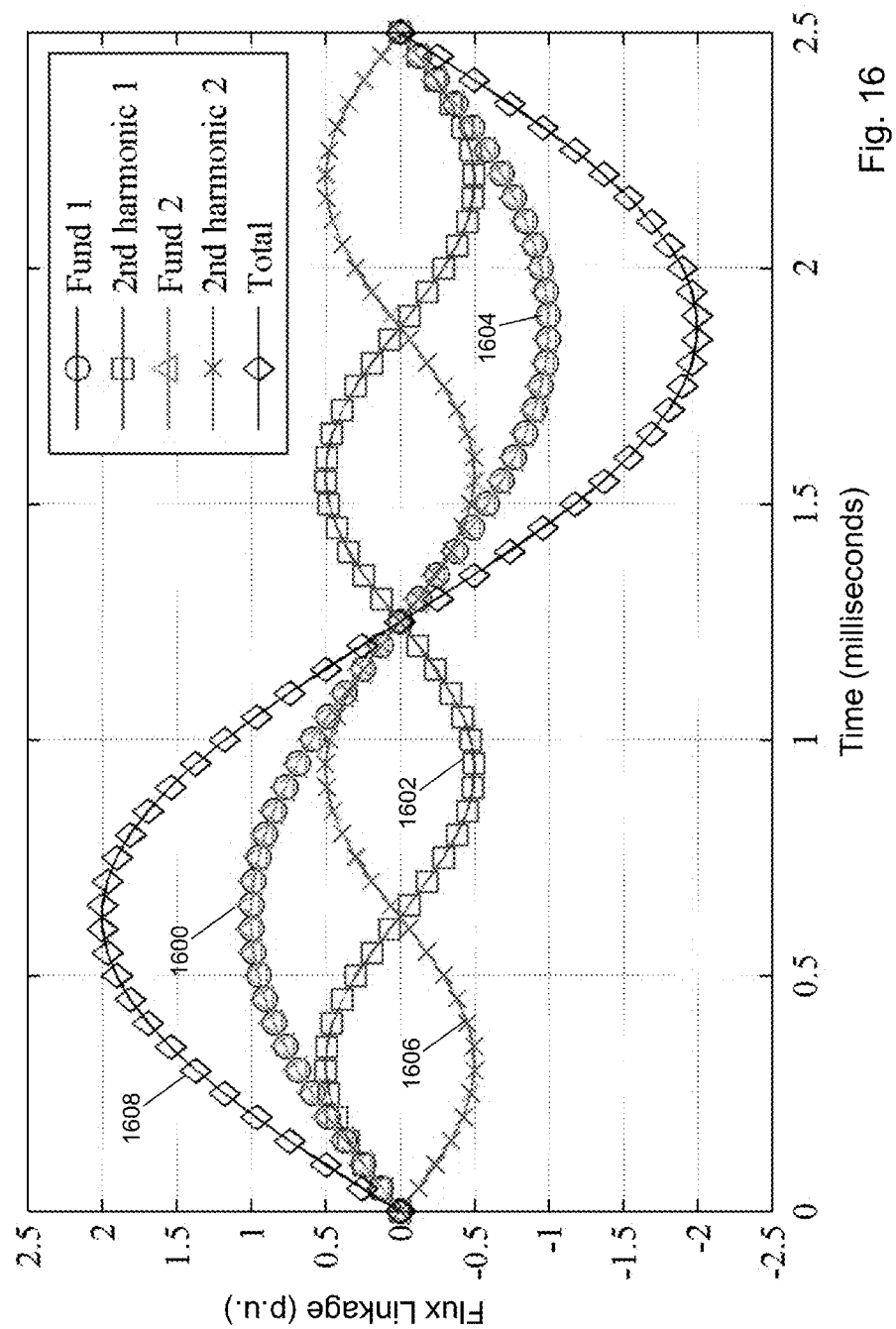
FIG. 16 depicts a flux linkage in a first pair of stator windings of the AFSPM of FIG. 1 in accordance with an illustrative embodiment.

Referring to FIG. 16, $\theta_{off}=\pi$ is shown in accordance with an illustrative embodiment of AFSPM 100, second AFSPM 1400, or third AFSPM 1500. A first curve 1600 shows a fundamental flux linkage from left stator 104. A second curve 1602 shows a second harmonic of flux linkage from left stator 104. A third curve 1604 shows a fundamental flux linkage from right stator 106. A fourth curve 1606 shows a second harmonic of flux linkage from right stator 106. A fifth curve 1608 shows a total flux linkage from left stator 104 and from right stator 106. Second curve 1602 and fourth curve 1606 sum to zero indicating that the second order harmonic component of flux linkage is effectively eliminated. First curve 1600 and third curve 1604 are in phase resulting in a total flux linkage that is doubled at the fundamental frequency. p.u. stands for per unit. A per-unit system is an expression of system quantities as fractions of a defined base unit quantity. Here, the peak value of the fundamental flux linkage defined the base unit quantity so that their peaks become one.

The various dimensions of the elements of rotor 102, second rotor 102a, third rotor 102b, left stator 104, and right stator 106, including the first air gap and the second air gap 110, may be determined based on desired rated performance characteristics using analytical sizing equations and finite element analysis using an electromechanical design tool.

The performance of AFSPM 100, second AFSPM 1400, and third AFSPM 1500 was evaluated using finite element analysis. A design specification of AFSPM 100, second AFSPM 1400, and third AFSPM 1500 is summarized in Table I below.

TABLE I

CALCULATED MACHINE DIMENSIONS

| Symbol | Quantity | Size |
|---|---|---|
| $D_o$ | Outer diameter | 350 mm |
| $D_i$ | Inner diameter | 114 mm |
| $l_{cr}$ | Rotor core thickness | 29 mm |
| $l_{cs}$ | Stator yoke thickness | 58 mm |
| $l_{st}$ | Stator tooth thickness | 84 mm |
| hpm | Magnet height | 84 mm | where $D_i$ is an inner diameter and $D_o$ is an outer diameter of rotor 102, 102a, 102b and of left stator core 300, the left plurality of magnets 302, right stator core 306, and the right plurality of magnets 308, and the stator yoke thickness is a thickness of bottom exterior face 414, top exterior face 426, bottom exterior face 514, and top exterior face 526.

Figure 17:
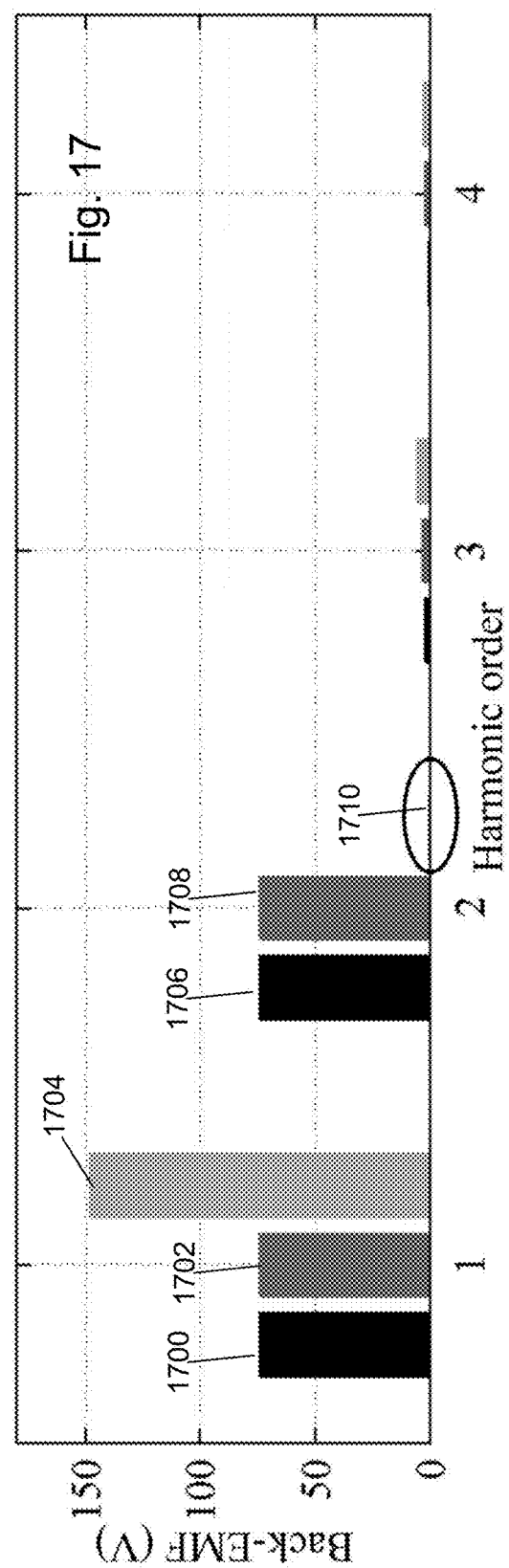
FIG. 17 depicts a back-electromotive force in the first pair of stator windings of the AFSPM of FIG. 1 in accordance with an illustrative embodiment.

FIG. 17 shows Fourier transform analysis results calculated for the back-EMF waveforms generated by AFSPM 100 with $\theta_{off}=\pi$. A first curve 1700 shows a fundamental back-EMF value from left stator 104. A second curve 1702 shows a fundamental back-EMF from right stator 106. A third curve 1704 shows a total fundamental back-EMF from left stator 104 and from right stator 106. A fourth curve 1706 shows a second harmonic of back-EMF from left stator 104. A fifth curve 1708 shows a second harmonic of back-EMF from right stator 106. A sixth curve 1710 shows a total second harmonic of back-EMF from left stator 104 and from right stator 106. The total fundamental harmonic is 148 Volts (V). The total second order harmonic is 0.233 V, which is a 99.8% cancellation compare to a conventional dual stator topology.

Figure 18:
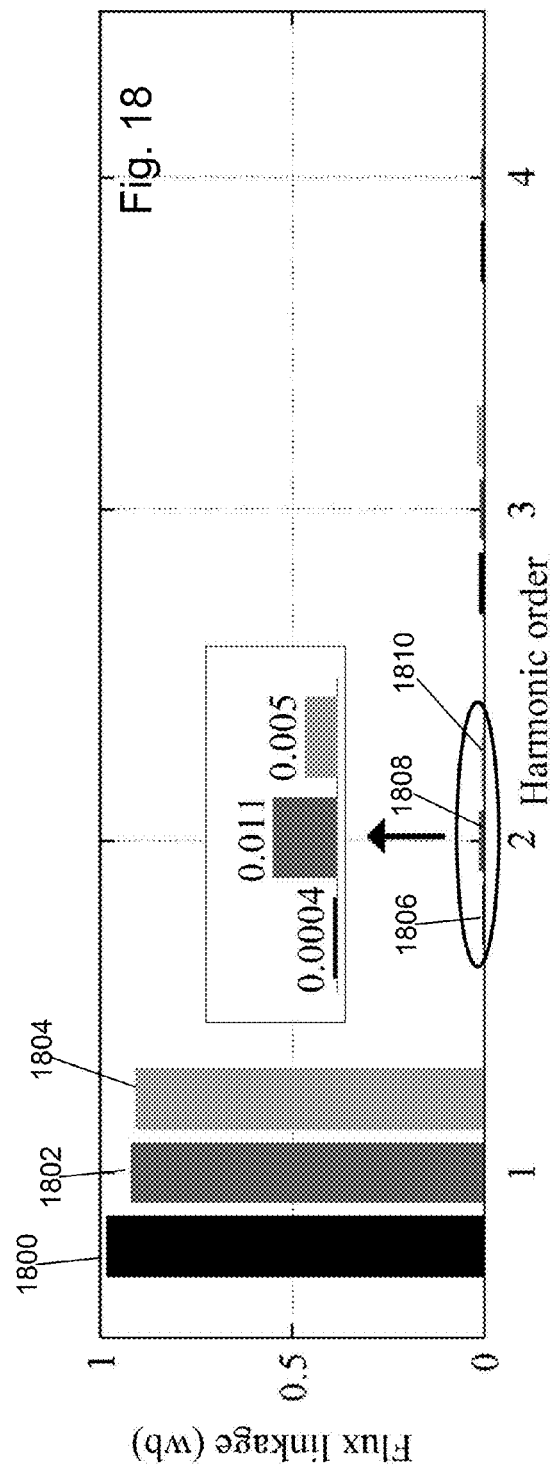
FIG. 18 depicts a flux linkage comparison between the AFSPM of FIG. 1, the second AFSPM of FIG. 14, and the third AFSPM of FIG. 15 in accordance with an illustrative embodiment.

FIG. 18 shows a comparison between the flux linkage generated by AFSPM 100, second AFSPM 1400, and third AFSPM 1500, with $\theta_{off}=\pi$. A first curve 1800 shows a total fundamental flux linkage value from left stator 104 and from right stator 106 of AFSPM 100. A second curve 1802 shows a total fundamental flux linkage value from left stator 104 and from right stator 106 of second AFSPM 1400. A third curve 1804 shows a total fundamental flux linkage value from left stator 104 and from right stator 106 of third AFSPM 1500. A fourth curve 1806 shows a total second harmonic of flux linkage from left stator 104 and from right stator 106 of AFSPM 100. A fifth curve 1808 shows a total second harmonic of flux linkage from left stator 104 and from right stator 106 of second AFSPM 1400. A sixth curve 1810 shows a total second harmonic of flux linkage from left stator 104 and from right stator 106 of third AFSPM 1500. AFSPM 100 produced a total fundamental flux linkage of 0.98 Weber (wb), while second AFSPM 1400 and third AFSPM 1500 produced 0.916 wb and 0.905 wb respectively. AFSPM 100 produced 6.98% and 8.28% larger total fundamental flux linkage than that of the second AFSPM 1400 and third AFSPM 1500. The total second order harmonics of AFSPM 100, second AFSPM 1400, and third AFSPM 1500 were 0.0004 wb, 0.011 wb, and 0.005 wb. Second AFSPM 1400 had 97.42% of remaining second order harmonic, while AFSPM 100 and third AFSPM 1500 had 99.8% and 98.73% respectively.

Figure 19:
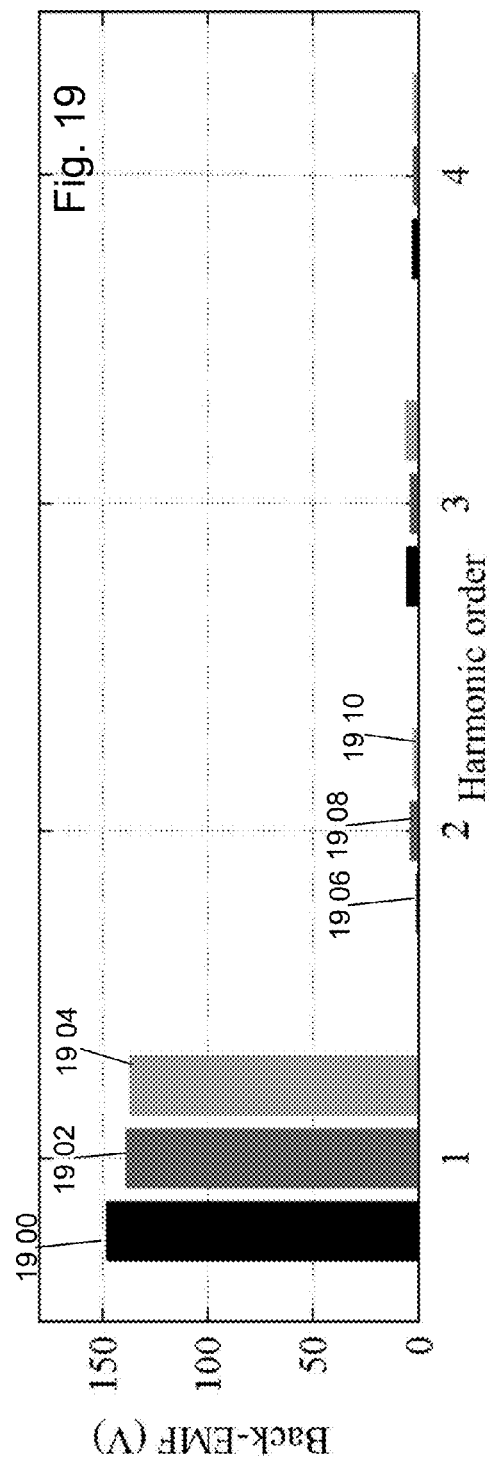
FIG. 19 depicts a back-electromotive force comparison between the AFSPM of FIG. 1, the second AFSPM of FIG. 14, and the third AFSPM of FIG. 15 in accordance with an illustrative embodiment.

FIG. 19 shows a comparison between the back-EMF generated by AFSPM 100, second AFSPM 1400, and third AFSPM 1500, with $\theta_{off}=\pi$. A first curve 1900 shows a total fundamental back-EMF value from left stator 104 and from right stator 106 of AFSPM 100. A second curve 1902 shows a total fundamental back-EMF value from left stator 104 and from right stator 106 of second AFSPM 1400. A third curve 1904 shows a total fundamental back-EMF value from left stator 104 and from right stator 106 of third AFSPM 1500. A fourth curve 1906 shows a total second harmonic of back-EMF from left stator 104 and from right stator 106 of AFSPM 100. A fifth curve 1908 shows a total second harmonic of back-EMF from left stator 104 and from right stator 106 of second AFSPM 1400. A sixth curve 1910 shows a total second harmonic of back-EMF from left stator 104 and from right stator 106 of third AFSPM 1500.

The analytical calculations were performed under the assumption that left stator 104 and right stator 106 of AFSPM 100, of second AFSPM 1400, and of third AFSPM 1500 were symmetrical and identical.

Instead of using a dual stator configuration, a dual rotor configuration also achieves the balanced flux linkage and back-EMF waveforms as discussed relative to AFSPM 100, second AFSPM 1400, and third AFSPM 1500. Referring to FIG. 20, a perspective view of a fourth AFSPM 2000 is shown in accordance with an illustrative embodiment. Fourth AFSPM 2000 may include a left rotor 102c, a right rotor 102d, and a stator 2002. In the illustrative embodiment, fourth AFSPM 2000 is a three-phase machine that can be configured as a generator or as a motor as understood by a person of skill in the art. In alternative embodiments, fourth AFSPM 2000 can be configured to support a fewer or a greater number of phases. Fourth AFSPM 2000 is essentially a rearrangement of the elements of second AFSPM 1400.

Left rotor 102c may be formed as a first half of second rotor 102a that includes half of rotor core 200 and the right plurality of poles. Right rotor 102d may be formed as a second half of second rotor 102a that includes a remaining half of rotor core 200 and the left plurality of poles. Left rotor 102c is mounted axially on a left side of stator 2002 and right rotor 102d is mounted axially on a right side of stator 2002. The first air gap separates stator 2002 from left rotor 102c and second air gap 110 (not visible) separates stator 2002 from right rotor 102d.

Stator 2002 is similar to left stator 104 and right stator 106 mounted together to form a single stator positioned axially between left rotor 102c and right rotor 102d. Stator 2002 may include a stator core 2004, a plurality of magnets 2006, the left plurality of windings 304, and the right plurality of windings 310. Stator core 2004 may include left stator core 300 and right stator core 306. Left exterior face 412 of each of the first plurality of core pieces of left stator core 300 is mounted to right exterior face 512 of the second plurality of core pieces of right stator core 306 to form stator 2002.

Figure 12:
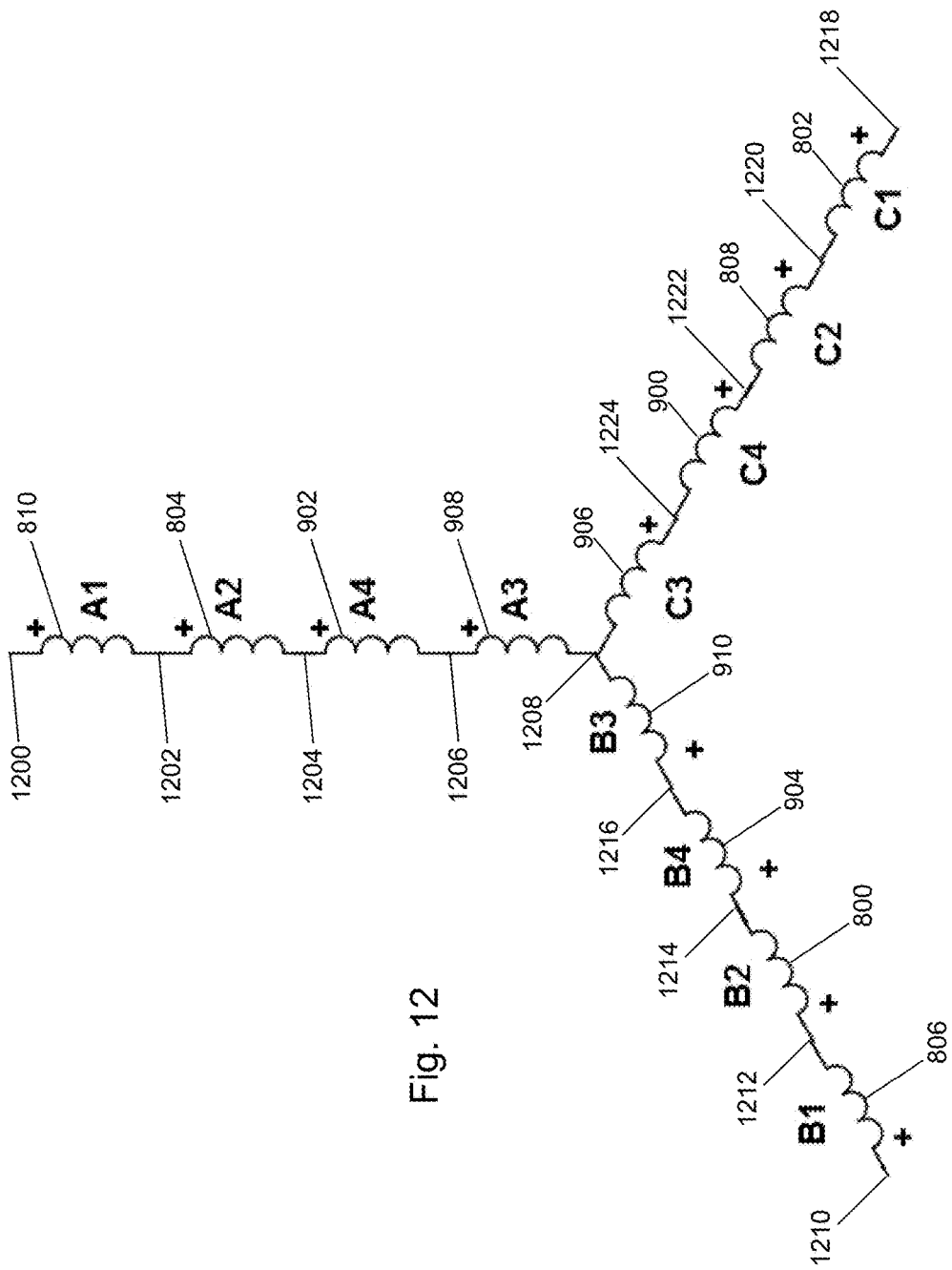
FIG. 12 depicts stator winding connections between the left stator and the right stator of the AFSPM of FIG. 1 in accordance with an illustrative embodiment.

The left plurality of windings 304 are mounted to the first plurality of core pieces of left stator core 300 that forms a right half of stator 2002. Second air gap 110 separates the left plurality of poles of right rotor 102d from the left plurality of windings 304. The right plurality of windings 310 are mounted to the second plurality of core pieces of right stator core 306 that forms a left half of stator 2002. The first air gap separates the right plurality of poles of left rotor 102c from the right plurality of windings 310. Third left winding 804 is aligned with second right winding 902 in the plane defined by vertical axis 236 and third axis 238. Similarly, fourth left winding 806 is aligned with third right winding 904; fifth left winding 808 is aligned with fourth right winding 906; sixth left winding 810 is aligned with fifth right winding 908; first left winding 800 is aligned with sixth right winding 910; and second left winding 802 is aligned with first right winding 900. The left plurality of windings 304 and the right plurality of windings 310 are connected as shown in FIG. 12.

The plurality of magnets 2006 is similar to the left plurality of magnets 302 and to the right plurality of magnets 308. The plurality of magnets 2006 are mounted between adjacent core pieces of stator core 2004 with alternating N-S polarity as described with reference to AFSPM 100.

Similar to second AFSPM 1400, left rotor 102c and right rotor 102d are shifted by 45 mechanical degrees resulting in 180 electric degrees shift based on the alignment between the left plurality of windings 304 and the right plurality of windings 310, which compensate each other as described with reference to second AFSPM 1400. As a result, the coil flux linkages add up to form a waveform that is very close to sinusoidal so that the three phase back-EMFs are balanced. Fourth AFSPM 2000 then achieves a similar performance to that described for AFSPM 100, second AFSPM 1400, and third AFSPM 1500.

AFSPM 100, second AFSPM 1400, third AFSPM 1500, and fourth AFSPM 2000 use a low number of rotor poles that is amenable particularly for high-speed operation though AFSPM 100, second AFSPM 1400, third AFSPM 1500, and fourth AFSPM 2000 can be used for medium and low speed applications. AFSPM 100, second AFSPM 1400, third AFSPM 1500, and fourth AFSPM 2000 also reduce core losses, copper losses, and inverter switching losses thereby increasing the efficiency and power density. Axial flux machines can be used in many applications including heating, ventilation, and air conditioning systems, industrial systems, flywheels, fans, pumps, traction drives for hybrid and electric vehicles, aircraft and marine applications, etc. AFSPM 100, second AFSPM 1400, third AFSPM 1500, and fourth AFSPM 2000 can be cascaded.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, in the detailed description, using "and" or "or" is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. An electrical machine comprising:
   a rotor comprising
      a rotor core having a first face and a second face, wherein the second face faces in a direction opposite to the first face, wherein an aperture is formed through the first face and the second face;
      a first plurality of poles mounted to extend from the first face; and
      a second plurality of poles mounted to extend from the second face;
   a first stator comprising a first plurality of core pieces, wherein each core piece of the first plurality of core pieces includes a slot having a first sidewall and a second sidewall;
   a second stator comprising a second plurality of core pieces, wherein each core piece of the second plurality of core pieces includes a slot having a first sidewall and a second sidewall;
   a first plurality of permanent magnets, wherein a permanent magnet of the first plurality of permanent magnets is mounted between the first sidewall and the second sidewall of adjacent core pieces of the first plurality of core pieces;
   a second plurality of permanent magnets, wherein a permanent magnet of the second plurality of permanent magnets is mounted between the first sidewall and the second sidewall of adjacent core pieces of the second plurality of core pieces;
   a first winding wound over the first sidewall of a first core piece of the first plurality of core pieces, over a first permanent magnet of the first plurality of permanent magnets mounted between the first sidewall of the first core piece and the second sidewall of a second core piece of the first plurality of core pieces, and over the second sidewall of the second core piece of the first plurality of core pieces, wherein the first core piece and the second core piece of the first plurality of core pieces are adjacent to each other;
   a second winding wound over the second sidewall of a third core piece of the first plurality of core pieces, over a second permanent magnet of the first plurality of permanent magnets mounted between the second sidewall of the third core piece and the first sidewall of a fourth core piece of the first plurality of core pieces, and over the first sidewall of the fourth core piece of the first plurality of core pieces, wherein the third core piece and the fourth core piece of the first plurality of core pieces are adjacent to each other;
   a third winding wound over the first sidewall of a first core piece of the second plurality of core pieces, over a first permanent magnet of the second plurality of permanent magnets mounted between the first sidewall of the first core piece and the second sidewall of a second core piece of the second plurality of core pieces, and over the second sidewall of the second core piece of the second plurality of core pieces, wherein the first core piece and the second core piece of the second plurality of core pieces are adjacent to each other; and
   a fourth winding wound over the second sidewall of a third core piece of the second plurality of core pieces, over a second permanent magnet of the second plurality of permanent magnets mounted between the second sidewall of the third core piece and the first sidewall of a fourth core piece of the second plurality of core pieces, and over the first sidewall of the fourth core piece of the second plurality of core pieces, wherein the third core piece and the fourth core piece of the second plurality of core pieces are adjacent to each other;
   wherein the first winding is closer to the third winding than to the fourth winding;
   wherein the first stator is mounted axially relative to the rotor so that a first air gap separates the first plurality of poles from the first winding and the second winding;
   wherein the second stator is mounted axially relative to the rotor so that a second air gap separates the second plurality of poles from the third winding and the fourth winding;
   wherein the first permanent magnet of the first plurality of permanent magnets and the second permanent magnet of the first plurality of permanent magnets have opposite polarities;
   wherein the first permanent magnet of the second plurality of permanent magnets and the second permanent magnet of the second plurality of permanent magnets have opposite polarities;
   wherein the first winding, the second winding, the third winding, and the fourth winding are connected in series; and
   wherein an absolute value of an angle offset between the first winding and the third winding and between closest poles of the first plurality of poles and the second plurality of poles is 180 electrical degrees.

2. The electrical machine of claim 1, wherein a number of the first plurality of core pieces equals a number of the second plurality of core pieces.

3. The electrical machine of claim 2, wherein a number of poles of the first plurality of poles equals a number of poles of the second plurality of poles.

4. The electrical machine of claim 3, wherein the number of the first plurality of core pieces is greater than the number of poles.

5. The electrical machine of claim 3, wherein the number of the first plurality of core pieces equals six, and the number of poles equals four.

6. The electrical machine of claim 1, wherein a number of the first plurality of core pieces is equal to two and a number of phases of a current of the electrical machine is one.

7. The electrical machine of claim 1, wherein a first number of the first plurality of core pieces and a second number of the second plurality of core pieces is two, and the third core piece and the second core piece of the first plurality of core pieces are the same core piece, and the first core piece and the fourth core piece of the first plurality of core pieces are the same core piece.

8. The electrical machine of claim 1, wherein a number of the first plurality of core pieces equals a number of the first plurality of permanent magnets.

9. The electrical machine of claim 1, wherein the second plurality of poles are aligned with the first plurality of poles.

10. The electrical machine of claim 1, wherein the second plurality of poles are rotated 180 electrical degrees relative to the first plurality of poles.

11. The electrical machine of claim 1, wherein the first permanent magnet of the first plurality of permanent magnets and the first permanent magnet of the second plurality of permanent magnets have a common polarity, and further wherein the second permanent magnet of the first plurality of permanent magnets and the second permanent magnet of the second plurality of permanent magnets have a common polarity.

12. The electrical machine of claim 1, wherein the first permanent magnet of the first plurality of permanent magnets and the first permanent magnet of the second plurality of permanent magnets have an opposite polarity, and further wherein the second permanent magnet of the first plurality of permanent magnets and the second permanent magnet of the second plurality of permanent magnets have the opposite polarity.

13. The electrical machine of claim 1, wherein the second plurality of poles are rotated $\theta_r$ electrical degrees relative to the first plurality of poles and wherein the second plurality of permanent magnets are rotated $\theta_s$ electrical degrees relative to the first plurality of permanent magnets, and $\theta_{off} = |\theta_s - \theta_r| = \pi$, where $\theta_{off}$ is the angle offset.

14. The electrical machine of claim 1, wherein each core piece of the first plurality of core pieces is mounted at a regular pitch circumferentially around a first aperture of the first stator.

15. The electrical machine of claim 14, wherein each core piece of the second plurality of core pieces is mounted at the regular pitch circumferentially around a second aperture of the second stator.

16. The electrical machine of claim 1, wherein the first winding is connected in series between the second winding and the third winding, and the third winding is connected in series between the first winding and the fourth winding.

17. An electrical machine comprising:
a first rotor comprising
a first rotor core having a first face and a second face, wherein the second face faces in a direction opposite to the first face, wherein an aperture is formed through the first face and the second face; and
a first plurality of poles mounted to extend from the first face of the first rotor core;
a second rotor comprising
a second rotor core having a first face and a second face, wherein the second face faces in a direction opposite to the first face, wherein an aperture is formed through the first face and the second face, wherein the first face of the first rotor core is in a same direction as the first face of the second rotor core; and
a second plurality of poles mounted to extend from the second face of the second rotor core;
a stator comprising a first plurality of core pieces and a second plurality of core pieces, wherein each core piece of the first plurality of core pieces and of the second plurality of core pieces includes a slot having a first sidewall and a second sidewall, wherein the first plurality of core pieces face towards the first plurality of poles and the second plurality of core pieces face towards the second plurality of poles;
a plurality of permanent magnets, wherein a permanent magnet of the plurality of permanent magnets is mounted between the first sidewall and the second sidewall of adjacent core pieces of the first plurality of core pieces and between the first sidewall and the second sidewall of adjacent core pieces of the second plurality of core pieces;
a first winding wound over the first sidewall of a first core piece of the first plurality of core pieces, over a first permanent magnet of the plurality of permanent magnets mounted between the first sidewall of the first core piece and the second sidewall of a second core piece of the first plurality of core pieces, and over the second sidewall of the second core piece of the first plurality of core pieces, wherein the first core piece and the second core piece of the first plurality of core pieces are adjacent to each other;
a second winding wound over the second sidewall of a third core piece of the first plurality of core pieces, over a second permanent magnet of the plurality of permanent magnets mounted between the second sidewall of the third core piece and the first sidewall of a fourth core piece of the first plurality of core pieces, and over the first sidewall of the fourth core piece of the first plurality of core pieces, wherein the third core piece and the fourth core piece of the first plurality of core pieces are adjacent to each other;
a third winding wound over the first sidewall of a first core piece of the second plurality of core pieces, over the first permanent magnet of the plurality of permanent magnets mounted between the first sidewall of the first core piece and the second sidewall of a second core piece of the second plurality of core pieces, and over the second sidewall of the second core piece of the second plurality of core pieces, wherein the first core piece and the second core piece of the second plurality of core pieces are adjacent to each other; and
a fourth winding wound over the second sidewall of a third core piece of the second plurality of core pieces, over the second permanent magnet of the plurality of permanent magnets mounted between the second sidewall of the third core piece and the first sidewall of a fourth core piece of the second plurality of core pieces, and over the first sidewall of the fourth core piece of the second plurality of core pieces, wherein the third core piece and the fourth core piece of the second plurality of core pieces are adjacent to each other;

wherein the first winding is closer to the third winding than to the fourth winding;

wherein the stator is mounted axially between the first rotor and the second rotor so that a first air gap separates the first plurality of poles from the first winding and the second winding, and a second air gap separates the second plurality of poles from the third winding and the fourth winding;

wherein the first permanent magnet of the plurality of permanent magnets and the second permanent magnet of the first plurality of permanent magnets have opposite polarities;

wherein the first winding, the second winding, the third winding, and the fourth winding are connected in series; and wherein the second plurality of poles is rotated 180 electrical degrees relative to the first plurality of poles.

18. The electrical machine of claim 17, wherein the slots of the first plurality of core pieces face in a direction opposite to slots of the second plurality of core pieces.

19. The electrical machine of claim 17, wherein each core piece of the first plurality of core pieces is mounted at a regular pitch circumferentially around a first aperture of the first stator.

20. The electrical machine of claim 19, wherein each core piece of the second plurality of core pieces is mounted at the regular pitch circumferentially around a second aperture of the second stator.

* * * * *